(12) United States Patent
Inoue et al.

(10) Patent No.: US 7,774,004 B2
(45) Date of Patent: Aug. 10, 2010

(54) REDUCING PAGING CONTROL TRAFFIC IN A MOBILE SYSTEM BY PLACING ROUTER IDENTIFICATIONS IN THE UPLINK PAGIN REQUEST PACKET

(75) Inventors: Masahiro Inoue, Yokosuka (JP); Ichiro Okajima, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 759 days.

(21) Appl. No.: 10/870,908

(22) Filed: Jun. 21, 2004

(65) Prior Publication Data

US 2004/0258008 A1     Dec. 23, 2004

(30) Foreign Application Priority Data

Jun. 20, 2003   (JP)   .............................. 2003-176841

(51) Int. Cl.
  *H04W 68/00*   (2009.01)
  *G06F 15/173*  (2006.01)
(52) U.S. Cl. ...................... 455/458; 709/238; 455/435.1
(58) Field of Classification Search ........................ None
  See application file for complete search history.

(56) References Cited

U.S. PATENT DOCUMENTS

| 6,496,497 | B1 * | 12/2002 | Lee et al. | ..................... 370/342 |
| 6,647,264 | B1 * | 11/2003 | Sasamoto | .................... 455/445 |
| 2002/0046287 | A1 * | 4/2002 | La Porta et al. | ............. 709/230 |

| 2002/0057663 | A1 | 5/2002 | Lim |
| 2003/0012151 | A1 | 1/2003 | Vassilovski |

FOREIGN PATENT DOCUMENTS

| EP | 1 255 381 A2 | 11/2002 |
| EP | 1 278 341 A2 | 1/2003 |

(Continued)

OTHER PUBLICATIONS

M. Liebsch, et al., "Paging Concept for IP based Networks", NEC Network Laboratories Europe, IETF Standard-Working-Draft, Internet Engineering Task Force, IETF, CH, No. 1, XP015034320, Sep. 2001, pp. 1-59.

(Continued)

*Primary Examiner*—Nick Corsaro
*Assistant Examiner*—Joel Ajayi
(74) *Attorney, Agent, or Firm*—Oblon, Spivak, McClelland, Maier & Neustadt, L.L.P.

(57) ABSTRACT

A network system implements paging control in which the control apparatus, upon receiving a packet destined for a mobile terminal, transmits a paging notification packet to a paging area of the mobile terminal, so as to obtain location information of the mobile terminal and to determine a transfer destination of a received packet. The control apparatus is configured to transmit the paging notification packet to a plurality of router devices included in the paging area. Each of the plurality of router devices is configured to transmit a received paging notification packet to a plurality of access points by multicasting. Each of the plurality of access points is configured to transmit a received paging notification packet to the mobile terminal through a link connection by multicasting, when it is judged that an IP address in the paging notification packet is a predetermined IP address.

7 Claims, 18 Drawing Sheets

FOREIGN PATENT DOCUMENTS

| | | |
|---|---|---|
| JP | 2001-7835 | 1/2001 |
| JP | 2001-257718 | 9/2001 |
| JP | 2002-94562 | 3/2002 |
| JP | 2002-335281 | 11/2002 |
| JP | 2003-23656 | 1/2003 |
| JP | 2003-110498 | 4/2003 |
| JP | 2003-153332 | 5/2003 |

OTHER PUBLICATIONS

B. Sarikaya, et al., "Mobile IPv6 Hierarchical Paging", Inria Rhone-Alpes, IETF Standard-Working-Draft, Internet Engineering Task Force, IETF, CH, XP015034933, Sep. 2001, pp. 1-22.

J. Kempf, et al., Network Working Group, Request for Comments: 3154, Paging Requirements, pp. 1-16, "Requirements and Functional Architecture for an IP Host Alerting Protocol", Aug. 2001.

* cited by examiner

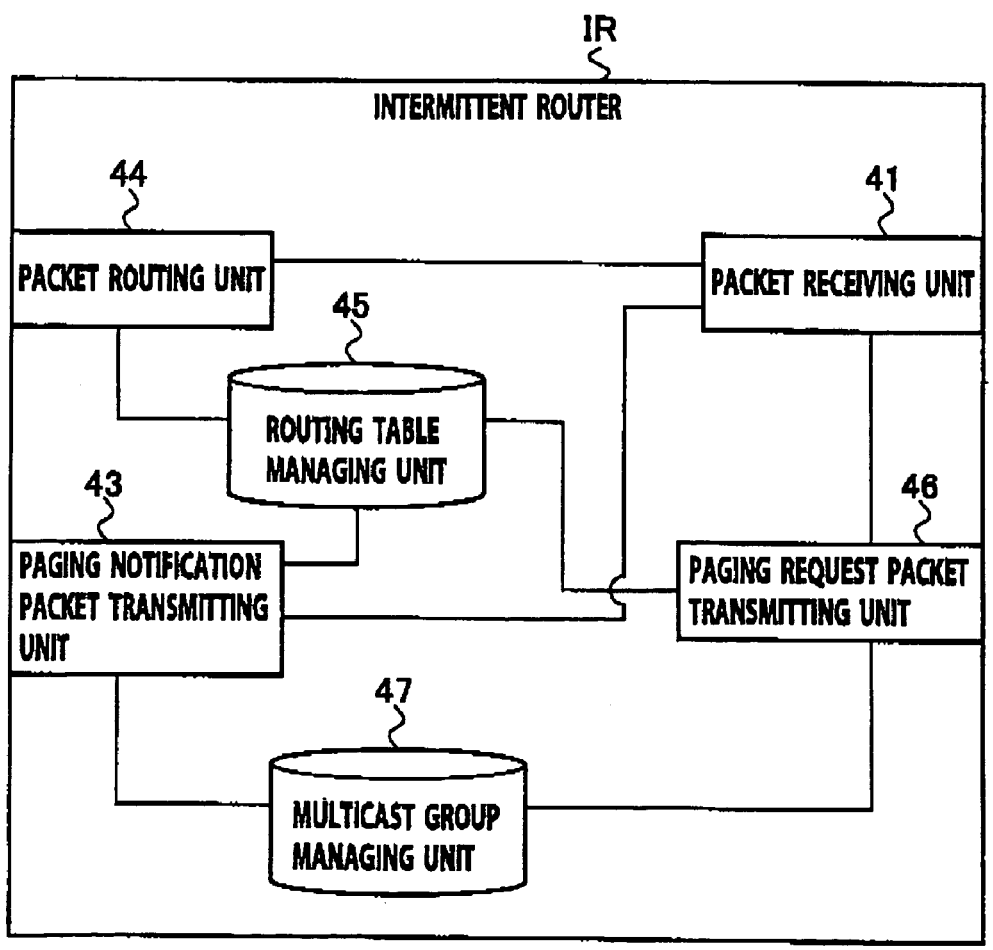

REDUCING PAGING CONTROL TRAFFIC IN A MOBILE SYSTEM BY PLACING ROUTER IDENTIFICATIONS IN THE UPLINK PAGIN REQUEST PACKET

CROSS REFERENCE TO RELATED APPLICATION

This application is based upon and claims the benefit of priority from the prior Japanese Patent Application No. P2003-176841, filed on Jun. 20, 2003; the entire contents of which are incorporated herein by reference.

BACKGROUND OF THE INVENTION

1. Field of the Invention

The present invention relates to a network system, a control apparatus, a router device, an access point, and a mobile terminal, which are used in a network implementing paging control.

2. Description of the Related Art

Paging control in a conventionally known mobile communication system is performed by using a control interface of a link layer provided in each mobile communication system.

However, such paging control has a problem in that paging control cannot be implemented over mobile communication systems having different link layers.

In order to overcome such a problem, IP paging control is known. In the IP paging control, when a control apparatus (paging agent) receives a packet destined for to a mobile terminal (host, mobile node), the control apparatus obtains location information of the mobile terminal (e.g., subnet prefix, IP address) by transmitting a paging notification packet to a paging area of the mobile terminal, so as to determine a transfer destination of the received packet.

The IP paging control can implement paging control in which differences between the link layers over different mobile communication systems are hidden by forming a paging area from subnet units of an IP layer.

Moreover, P-MIP technology is known, which performs paging control by means of a foreign agent (FA) representative of a plurality of FAs or by means of a paging agent managing a paging area, by extending Mobile IPv4.

However, the conventional IP paging control has a problem in that transmission load is high, because a paging notification packet is transmitted individually to all subnets constituting a paging area by using a standard unicasting method.

The conventional IP paging control also has a problem in that limited wireless resources are wastefully consumed, because, before a paging notification packet is transmitted, access routers have to transmit neighbor discovery packets based on a protocol for searching for a neighbor, such as ARP (Address Resolution Protocol) or NDP (Neighbor Discovery Protocol).

The conventional IP paging control further has a problem in that a control apparatus is congested with replies of ICMP (Internet Control Message Protocol) error packets. Because, in the case that there is no reply to the neighbor discovery packets transmitted when receiving the paging notification packet having a unicast address including a subnet prefix of an access router as a destination, the access router transmits an ICMP error packet indicating the result that the paging notification packet is unreachable to the control apparatus.

Here, the ICMP is a control protocol prepared for complementing the functions of TCP/IP, and is used for notification of various errors occurring while a TCP/IP packet is being transferred, confirmation of operation, and the like.

BRIEF SUMMARY OF THE INVENTION

In viewing of the foregoing, it is an object of the present invention to provide a network system, a control apparatus, a router device, an access point and a mobile terminal, which can reduce the traffic on a network implementing paging control.

A first aspect of the present invention is summarized as a network system implementing paging control in which the control apparatus, upon receiving a packet destined for a mobile terminal, transmits a paging notification packet to a paging area of the mobile terminal, so as to obtain location information of the mobile terminal and to determine a transfer destination of a received packet. The control apparatus is configured to transmit the paging notification packet to a plurality of router devices which form the paging area. Each of the plurality of router devices is configured to transmit a received paging notification packet to a plurality of access points by multicasting. Each of the plurality of access points is configured to transmit a received paging notification packet to the mobile terminal through a link connection by multicasting, when it is judged that an IP address in the paging notification packet is a predetermined IP address.

A second aspect of the present invention is summarized as a control apparatus in a network implementing paging control in which the control apparatus, upon receiving a packet destined for a mobile terminal, transmits a paging notification packet to a paging area of the mobile terminal, so as to obtain location information of the mobile terminal and to determine a transfer destination of a received packet. The control apparatus includes a paging notification packet transmitter configured to transmit the paging notification packet to a plurality of router devices which form the paging area. Each of the plurality of router devices is configured to transmit a received paging notification packet to the mobile terminal by multicasting.

In the second aspect, the paging notification packet transmitter can be configured to transmit the paging notification packet to each of the plurality of router devices by unicasting.

In the second aspect, the paging notification packet transmitter can be configured to transmit the paging notification packet including information indicating the plurality of router devices.

In the second aspect, the control apparatus can further include a manager configured to manage the mobile terminal and a multicast group including the plurality of router devices while associating the mobile terminal and the multicast group with each other. And the paging notification packet transmitter can be configured to transmit the paging notification packet to the multicast group.

In the second aspect, the control apparatus can further include a multicast group joining packet transmitter configured to transmit a multicast group joining packet to the plurality of router devices. Here, the multicast group joining packet prompts the router device to join in the multicast group. And the manager can be configured to manage the mobile terminal and the multicast group including the plurality of router devices while associating the mobile terminal and the multicast group with each other. Here, the plurality of router devices is designated in a paging request packet received from the mobile terminal.

A third aspect of the present invention is summarized as a router device in a network implementing paging control in which a control apparatus, upon receiving a packet destined for a mobile terminal, transmits a paging notification packet to a paging area of the mobile node, so as to obtain location information of the mobile terminal and to determine a transfer destination of a received packet. The router device includes a judger configured to judge whether or not a received packet is the paging notification packet; and a paging notification packet transmitter configured to transmit the packet to the mobile terminal by multicasting, when it is judged that the packet is the paging notification packet.

A fourth aspect of the present invention is summarized as a router device in a network implementing paging control in which a control apparatus, upon receiving a packet destined for a mobile terminal, transmits a paging notification packet to a paging area of the mobile node, so as to obtain location information of the mobile terminal and to determine a transfer destination of a received packet. The router device includes a routing determiner configured to determine at least one routing destination of the paging notification packet, in accordance with information indicating a router device which is included in the paging notification packet; and a transferor configured to copy and transfer the paging notification packet to each routing destination determined in accordance with the information indicating a plurality of the router devices, when receiving the paging notification packet.

A fifth aspect of the present invention is summarized as a router device in a network implementing paging control in which a control apparatus, upon receiving a packet destined for a mobile terminal, transmits a paging notification packet to a paging area of the mobile node, so as to obtain location information of the mobile terminal and to determine a transfer destination of a received packet. The router device includes a multicast group manager configured to manage a multicast group including a plurality of router devices; and a paging request packet transmitter configured to transmit a paging request packet to the plurality of router devices included in the multicast group, in accordance with identification information of the multicast group. Here, the identification information is included in the paging request packet transmitted from the mobile terminal in order to form the paging area.

A sixth aspect of the present invention is summarized as an access point in a network implementing paging control in which a control apparatus, upon receiving a packet destined for a mobile terminal, transmits a paging notification packet to a paging area of the mobile node, so as to obtain location information of the mobile terminal and to determine a transfer destination of a received packet, The access point includes a link controller configured to control a link connection; and a judger configured to judge whether or not an IP address in the paging notification packet received by the access point is a predetermined IP address. And the link controller is configured to transmit the paging notification packet to the mobile terminal through the link connection by multicasting, when it is judged that the IP address in the paging notification packet is the predetermined IP address.

In the sixth aspect, the access point can further include a paging notification acknowledgment packet transmitter configured to transmit a paging notification acknowledgment packet to the control apparatus, when it is judged that the IP address in the paging notification packet is the predetermined IP address, and when it is judged that the link connection with the mobile terminal has been established. Here, the paging notification acknowledgment packet is a reply to the paging notification packet.

A seventh aspect of the present invention is summarized as a mobile terminal in a network implementing paging control in which a control apparatus, upon receiving a packet destined for the mobile terminal, transmits a paging notification packet to a paging area of the mobile node, so as to obtain location information of the mobile terminal and to determine a transfer destination of a received packet. The mobile terminal includes a paging request packet transmitter configured to transmit a paging request packet so as to form the paging area. The paging request packet transmitter is configured to instruct to join in a multicast group including a plurality of router devices by using the paging request packet. The plurality of router devices form the paging area.

BRIEF DESCRIPTION OF THE SEVERAL VIEWS OF THE DRAWINGS

FIG. 10 is a view showing an example of information managed by a paging area managing unit in a paging agent according to a third embodiment of the present invention.

FIG. 11 is a functional block diagram of an intermittent router according to the third embodiment of the present invention.

DETAILED DESCRIPTION OF THE INVENTION

Figure 1:
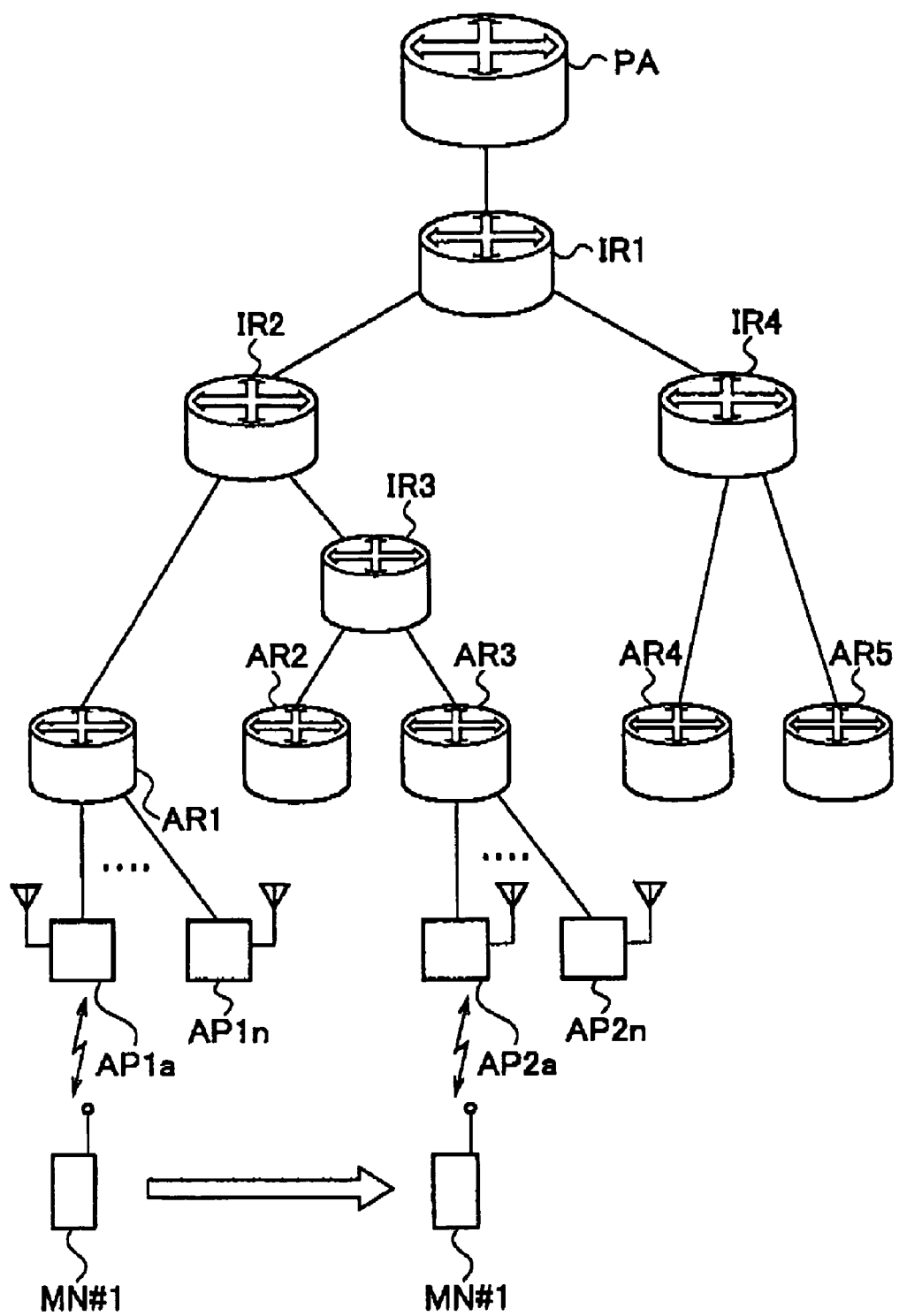
FIG. 1 is a view for explaining the outline of a network according to embodiments of the present invention.

FIG. 1 is a view showing a network (network system) implementing paging control in first to forth embodiments of the present invention.

As shown in FIG. 1, this network includes a paging agent PA, a plurality of intermittent routers IR1 to IR4, a plurality of access routers AR1 to AR5, and access points AP1a to AP1n and AP2a to AP2n.

Moreover, it is assumed that a variety of mobile communication systems and wire communication systems coexist in this network. That is, since paging agents PA1 to PAm according to these embodiments manage routing information at an IP layer where subnet prefixes, IP addresses and the like are used, the paging agents PA1 to PAm can manage even a mobile node MN which subscribes to various mobile and wire communication systems, based on the same framework.

In these embodiments, it is assumed that a state of a mobile node MN#1 shifts from a state in connection with the access point PA1a to a state in connection with the access point PA2a. Moreover, in these embodiments, it is assumed that a paging area of the mobile node MN#1 is formed with the access routers AR1 to AR3.

Configuration of First Embodiment of the Invention

A configuration of the first embodiment of the present invention will be described with reference to FIGS. 2 to 4.

The mobile node MN#1 is a mobile terminal capable of operating in two modes: a normal mode and a paging control mode.

In the normal mode, the mobile node MN#1 is configured to perform mobility management operation which is realized by Mobile IP (MIP) or its extended technology.

On the other hand, in the paging control mode, the mobile node MN#1 is configured to stop the mobility management operation, to register the state of the mobile node MN#1 to the paging agent PA, and to judge whether or not the mobile node MN#1 is located in the paging area while dedicating itself to receiving packets.

Figure 2:
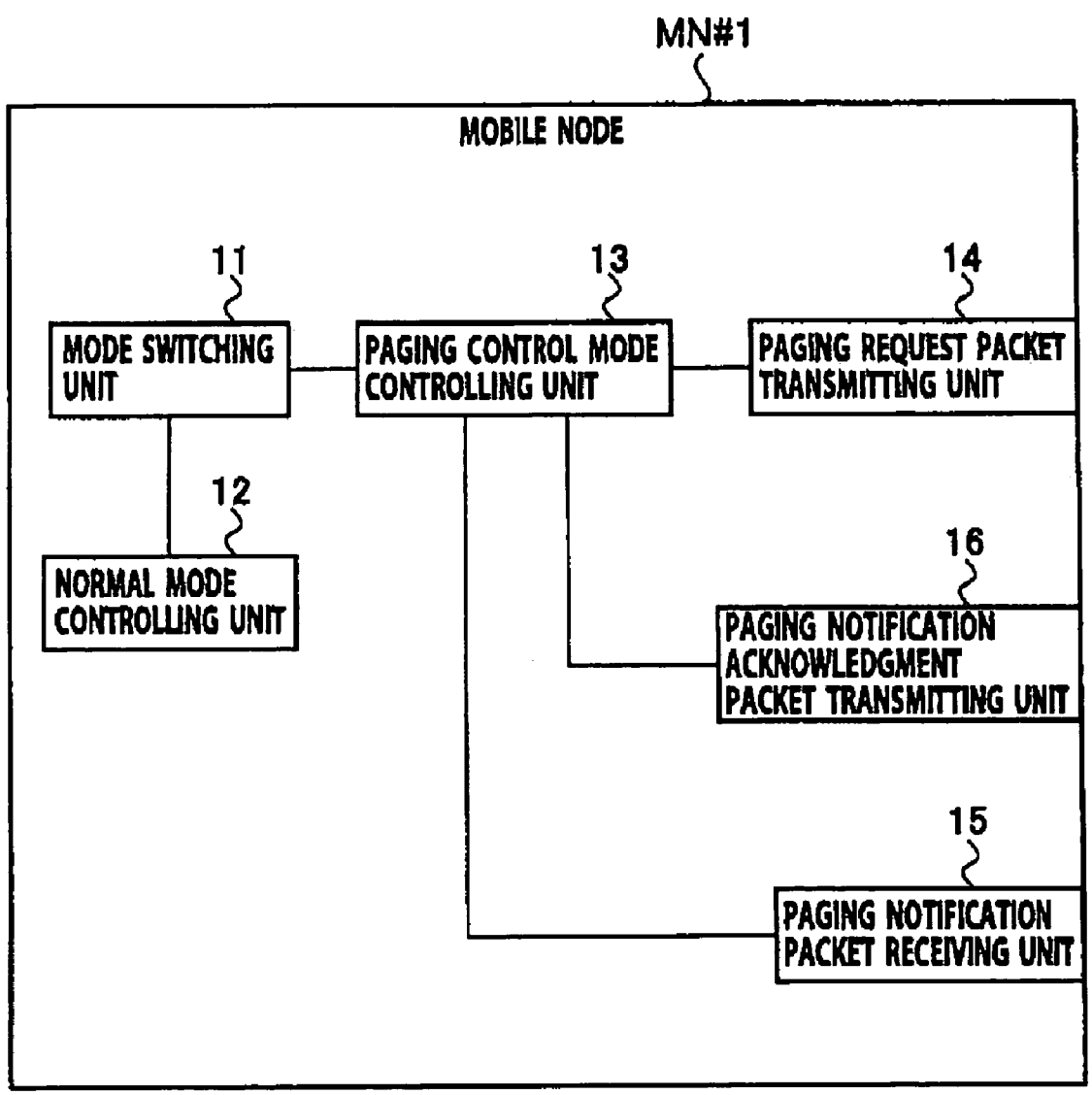
FIG. 2 is a functional block diagram of a mobile node according to a first embodiment of the present invention.

As shown in FIG. 2, the mobile node MN#1 is configured with a mode switching unit 11, a normal mode controlling unit 12, a paging control mode controlling unit 13, a paging request packet transmitting unit 14, a paging notification packet receiving unit 15, and a paging notification acknowledgement packet transmitting unit 16.

The mode switching unit 11 is configured to switch the mode of the mobile node MN#1 between the normal mode and the paging control mode, in response to operation by a user of the mobile node MN#1.

Moreover, the mode switching unit 11 is configured to switch the state of the mobile node MN#1 from a state of operating in the paging control mode to a state of operating in the normal mode, when a paging notification packet is received.

The normal mode controlling unit 12 is configured to perform control to cause the mobile node MN#1 to operate in the above-mentioned normal mode. The paging control mode controlling unit 13 is configured to perform control to cause the mobile node MN#1 to operate in the above-mentioned paging control mode.

The paging request packet transmitting unit 14 is configured to transmit a paging request packet for forming a paging area to the paging agent PA, in response to an instruction from the paging control mode controlling unit 13.

For example, the paging request packet transmitting unit 14 transmits a paging request packet which includes information indicating a plurality of the access routers AR1 to AR3 which forms a paging area (for example, a list of IP addresses within the coverage of the access routers AR1 to AR3, or a set of subnet prefixes within the coverage of the access routers AR1 to AR3).

Here, the paging request packet includes an IP header and a paging control header, and the above-mentioned information indicating the plurality of access routers AR1 to AR3 is included in the paging control header.

The paging notification packet receiving unit 15 is configured to receive a paging notification packet transmitted from the paging agent PA, and to notify this fact to the paging control mode controlling unit 13.

Specifically, the paging notification packet receiving unit 15 receives a paging notification packet transmitted by multicasting from the access point AP2a.

For example, the paging notification packet receiving unit 15 conforms to IGMP (Internet Group Management Protocol) and MLD (Multicast Listener Discovery).

When the group ID of a multicast address in a received IF packet is a value indicative of a paging notification packet, or when the link layer address (MAC address) in the IP packet belongs to a predetermined multicast group, the paging notification packet receiving unit 15 recognizes the paging notification packet destined for the mobile node MN#1.

Here, the IGMP and MLD are protocols used, so that a router device, which supports IPv4 or IPv6 multicasting method respectively, may know the presence of a member of a multicast group existing on the same physical network as the router device.

The paging notification acknowledgement packet transmitting unit 16 is configured to transmit a paging notification acknowledgement packet, in response to an instruction from the paging control mode controlling unit 13.

The paging notification acknowledgement packet notifies the paging agent PA that the paging notification packet has been received while the mobile node MN#1 is communicating with the access point AP2a (information on the location of the mobile node MN#1, that is, a subnet prefix within the coverage of the access router AR3).

Figure 3:
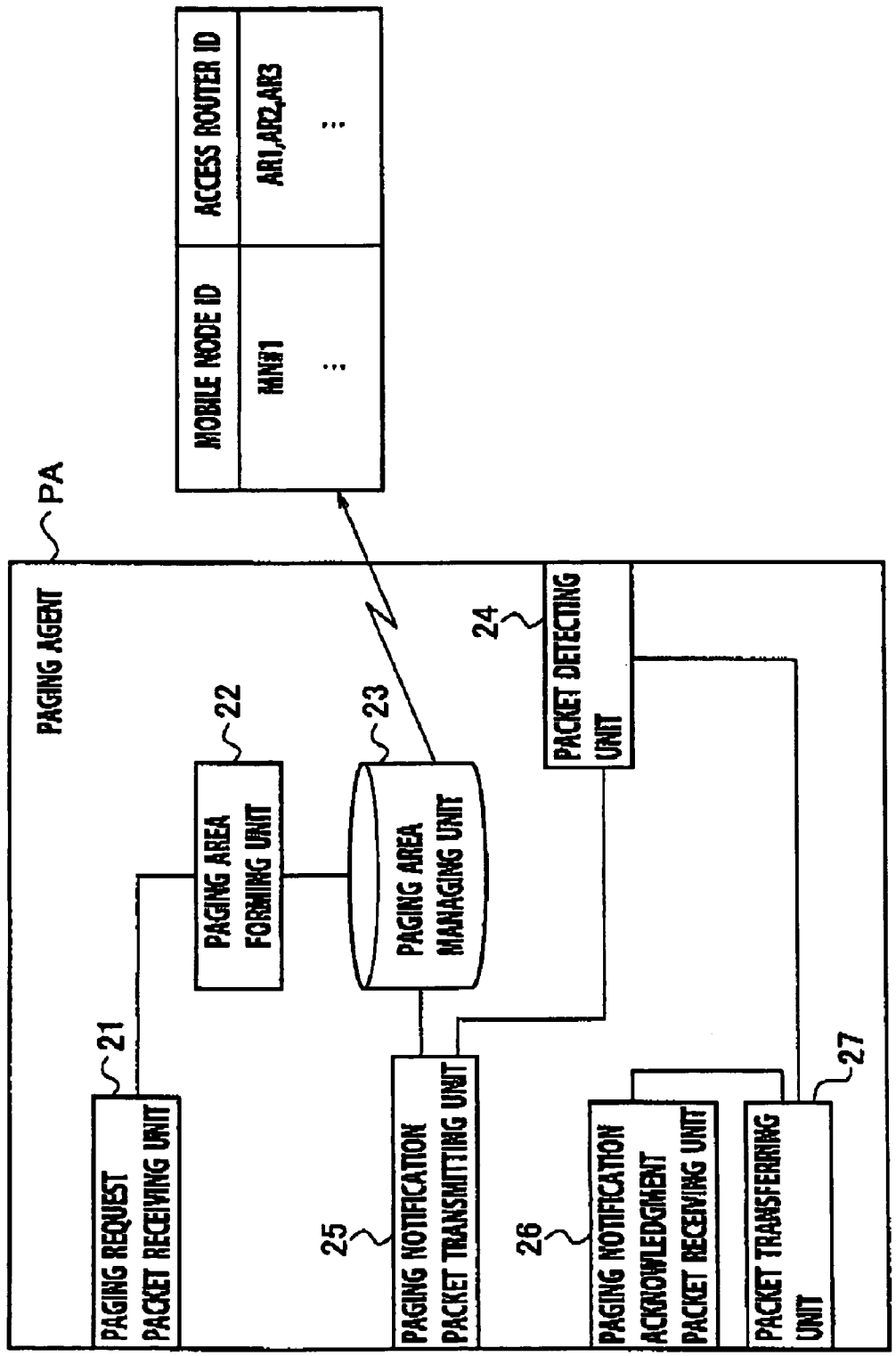
FIG. 3 is a functional block diagram of a paging agent according to the first embodiment of the present invention.
Figure 4:
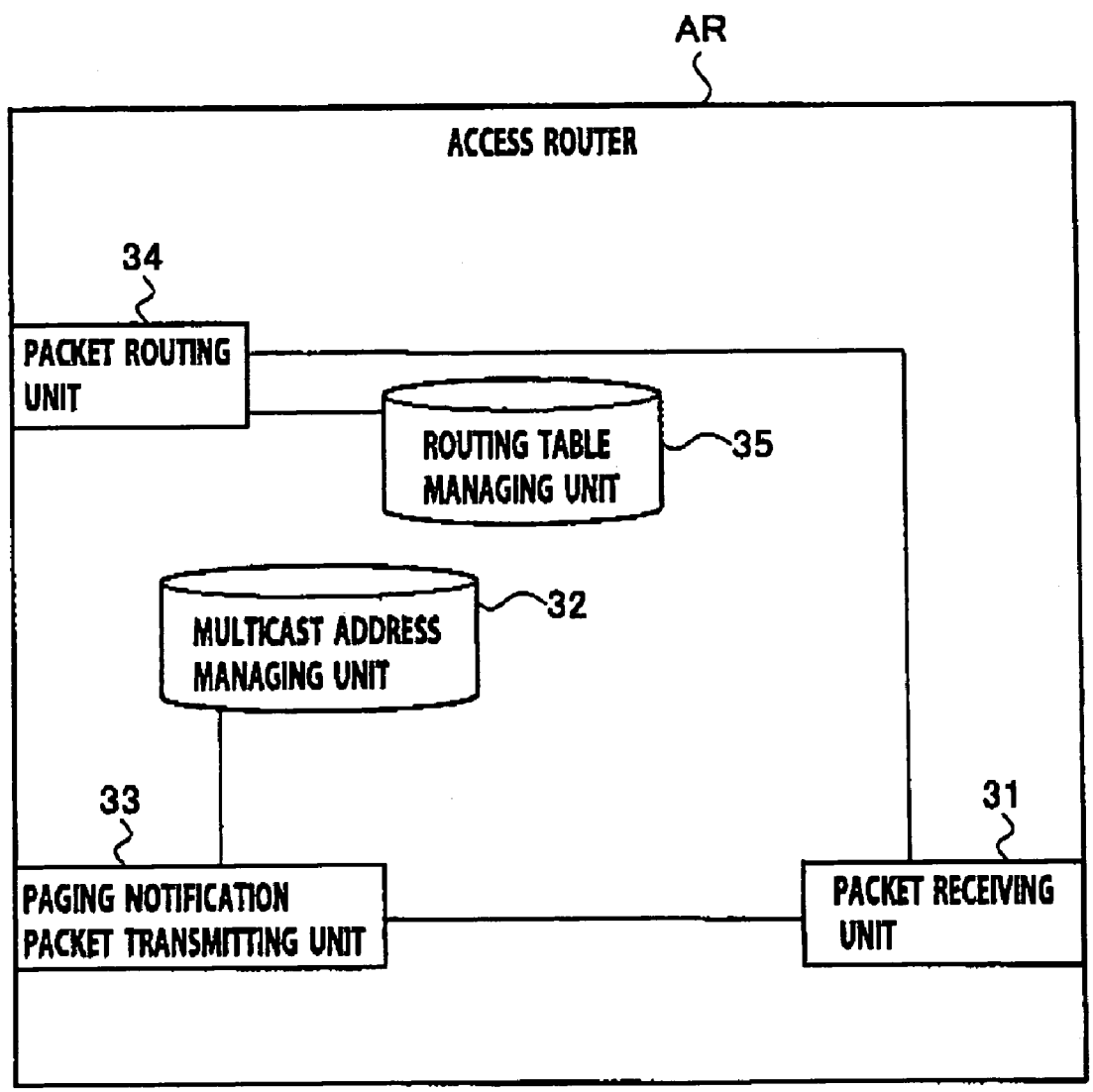
FIG. 4 is a functional block diagram of an access router according to the first embodiment of the present invention.

As shown in FIG. 3, the paging agent PA is a control apparatus configured with a paging request packet receiving unit 21, a paging area forming unit 22, a paging area managing unit 23, a packet detecting unit 24, a paging notification packet transmitting unit 25, a paging notification acknowledgement packet receiving unit 26, and a packet transferring unit 27.

The paging request packet receiving unit 21 is configured to receive a paging request packet transmitted from the mobile node MN#1, and to transmit the packet to the paging area forming unit 22.

The paging area forming unit 22 is configured to form a paging area of the mobile node MN#1, based on the received paging request packet.

For example, the paging area forming unit 22 determines that the paging area of the mobile node MN#1 is a paging area which is formed with the access routers AR1 to AR3, based on information indicating the access routers AR1 to AR3 which is included in the received paging request packet.

The paging area managing unit 23 is configured to manage the paging area of the mobile node MN#1. For example, the paging area managing unit 23 stores a "mobile node ID" and an "access router ID" while associating them with each other.

Here, the "access router ID" may be a list of IF addresses within the coverage of the access routers AR1 to AR3 forming the paging area, or may be a subnet prefix within the coverage of the access router AR1 to AR3.

The packet detecting unit 24 is configured to detect an IP packet destined for the mobile node MN#1, and to buffer the IP packet. Simultaneously, the packet detecting unit 24 notifies this fact to the paging notification packet transmitting unit 25.

Moreover, the packet detecting unit 24 transmits the IP packet destined for the mobile node MN#1, which is being buffered, in response to an instruction from the packet transferring unit 27.

The paging notification packet transmitting unit 25 is configured to transmit a paging notification packet to the access routers AR1 to AR3 forming the paging area of the mobile node MN#1, in response to the notification from the packet detecting unit 24.

Specifically, the paging notification packet transmitting unit 25 sequentially transmits a paging notification packet to each of the access routers AR1 to AR3 by unicasting.

Here, the paging notification packet includes an IP header, a paging control header and an information part. In the IP header of the paging notification packet, the unicast IP address of each of the access routers AR1 to AR3 is included as a destination address, and the IP address of the paging agent PA is included as a source address. Further, the home address of the mobile node MN#1 is included in the information part of the paging notification packet.

The paging notification packet transmitting unit 25 can be configured to designate access routers ARs forming a paging area by using "subnet router unicast address" which designates a subnet described in the "Reserved IPv6 subnet anycast addresses, RFC2526, March, 1999", when transmitting the paging notification packets.

Specifically, intermittent routers IRs are configured to transfer paging notification packets including the subnet router unicast address by unicasting.

Routers corresponding to the subnet are configured to convert the destination address of the paging notification packet into a multicast address which can be used in a interface assigned to the subnet, so as to transmit the paging notification packet.

Alternatively, routers corresponding to the subnet can be configured to perform a de-capsuling process on the paging notification packet, so as to transmit the paging notification including an address specifying a mobile node MN on which the paging process is performed as the destination address.

The paging notification acknowledgement packet receiving unit 26 is configured to receive a paging notification acknowledgement packet transmitted from the mobile node MN#1, and to notify this fact to the packet transferring unit 27.

The packet transferring unit 27 is configured to extract an IP packet corresponding to the received paging notification acknowledgement packet from the packet detecting unit 24, and to transfer the extracted IP packet, based on the location information (subnet prefix, IP address or the like) of the mobile node MN#1 which is included in the paging notification acknowledgement packet.

The access router AR is a router device connected to an intermittent router IR and to at least one access point AP. As shown in FIG. 4, the access router AR is configured with a packet receiving unit 31, a multicast address managing unit 32, a paging notification packet transmitting unit 33, a packet routing unit 34, and a routing table managing unit 35.

The packet receiving unit 31 is configured to receive an IR packet (including a paging notification packet) transferred from the intermittent router IR.

When the packer receiving unit 31 recognizes that the received IP packet is a paging notification packet, based on a protocol identifier, a header number or the like included in a received IP packet, the packet receiving unit 31 transmits the IP packet to the paging notification packet transmitting unit 33.

Otherwise, the packet receiving unit 31 transmits the IP packet to the packet routing unit 34.

The multicast address managing unit 32 is configured to manage a group ID of a multicast group, a MAC address, and the like where a paging notification packet belongs.

The paging notification packet transmitting unit 33 is configured to transmit a received paging notification packet to the mobile node MN#1 by multicasting.

Specifically, using the IGMP or MLD, the paging notification packet transmitting unit 33 transmits a paging notification packet over an interface within the coverage of the access router AR, with a multicast address effective in a counter-link as a destination.

The packet routing unit 34 is configured to route IP packets other than a paging packet, referring to a routing table. The routing table managing unit 35 is configured to manage the routing table.

Operation in First Embodiment of the Invention

Overall operation in this embodiment will be described with reference to FIGS. 5 and 6.

In Step 101, the mobile node MN#1 transmits a paging request packet for forming a paging area including the access routers AR1 to AR3, to the paging agent PA via the access point AP1a, the access router AR1, the intermittent router IR1, and the intermittent router IR2.

In Step 102, the paging agent PA forms the paging area of the mobile node MN#1, based on information indicating the access routers AR1 to AR3 which is included in the received paging request packet.

In Step 103, the paging agent PA receives an IP packet destined for the mobile node MN#1. Here, it is assumed that a state of the mobile node MN#1 has shifted from a state of communicating with the access point AP1a to a state of communicating with the access point AP2a.

In Step 104, the paging agent PA sequentially transmits a paging notification packet to each of the access routers AR1 to AR3 by unicasting.

In Step 105, when the access routers AR1 to AR3 recognize that they have received the paging notification packets destined for the access routers AR1 to AR3 respectively, each of the access routers AR1 to AR3 transmits the paging notification packet by multicasting.

In Step 106, the mobile node MN#1, which has received the paging notification packet, starts operating in the normal mode, and transmits a paging notification acknowledgment packet to the paging agent PA via the access point AP2a, with which the mobile node MN#1 is communicating, the access router AR3, the intermittent router IR3, and the intermittent router IR2.

The paging notification acknowledgment packet includes the location information of the mobile node MN#1 (e.g., a subnet prefix within the coverage of the access router AR3).

In Step 107, the paging agent PA transfers the IP packet, which has been being buffered, to the mobile node MN#1, based on the location information of the mobile node MN#1 (e.g., a subnet prefix within the coverage of the access router AR3) which is included in the paging notification acknowledgment packet.

Operational Advantage of the First Embodiment of the Invention

According to the first embodiment of the present invention, the paging agent PA transmits a paging notification packet to each of the access routers AR1 to AR3 forming the paging area by unicasting, Therefore, it is possible to reduce paging notification packet traffic on the network.

Moreover, according to the first embodiment of the present invention, it is possible to allow a paging notification packet to be delivered to the mobile node MN#1 without the access routers AR1 to AR3 creating a neighbor discovery packet based on unicasting. It is also possible to overcome the problem in that the paging agent PA is congested with ICMP error packets.

Second Embodiment of the Invention

Figure 8:
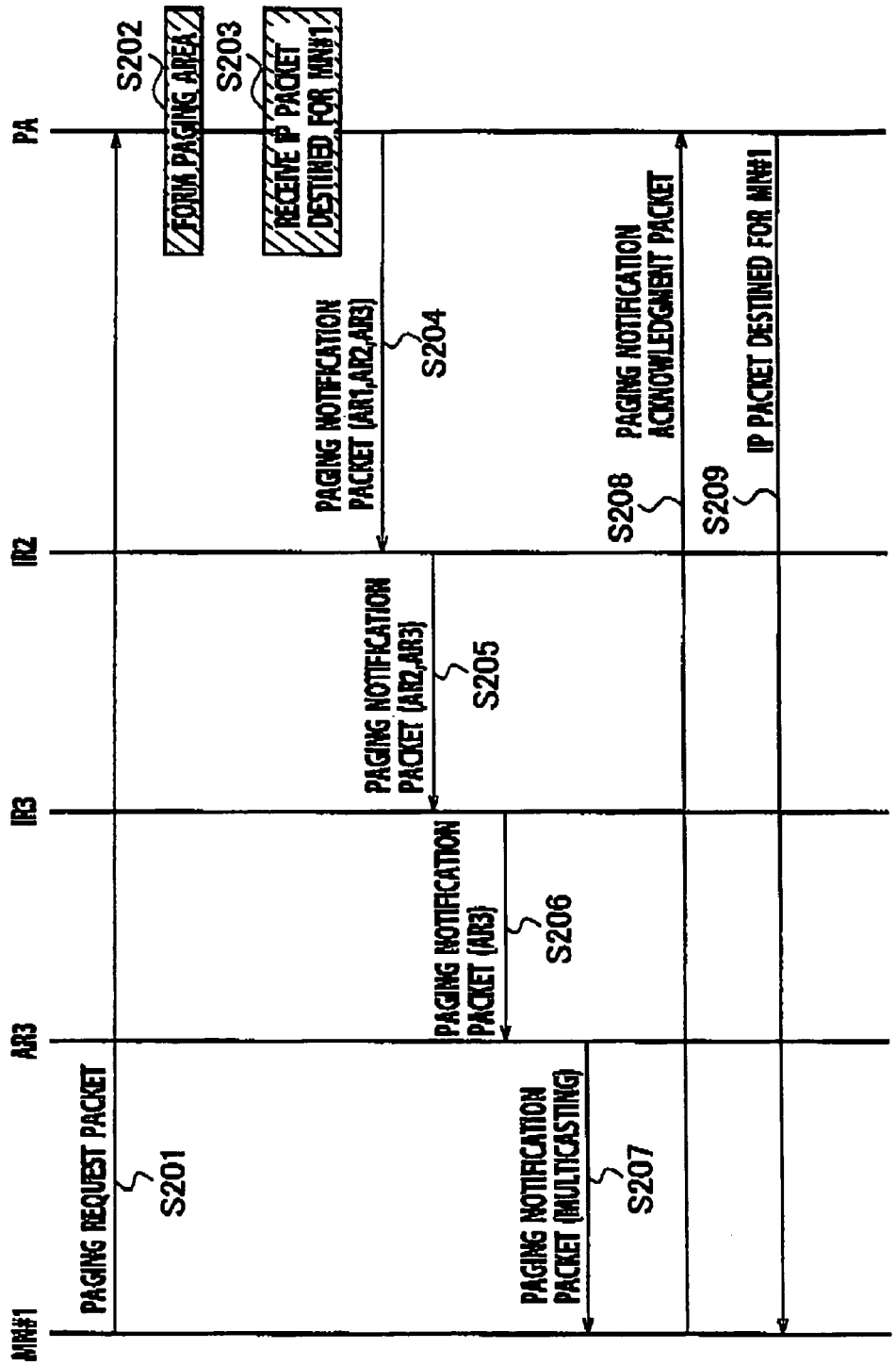
FIG. 8 is a sequence diagram showing overall operation in the second embodiment of the present invention.
Figure 9:
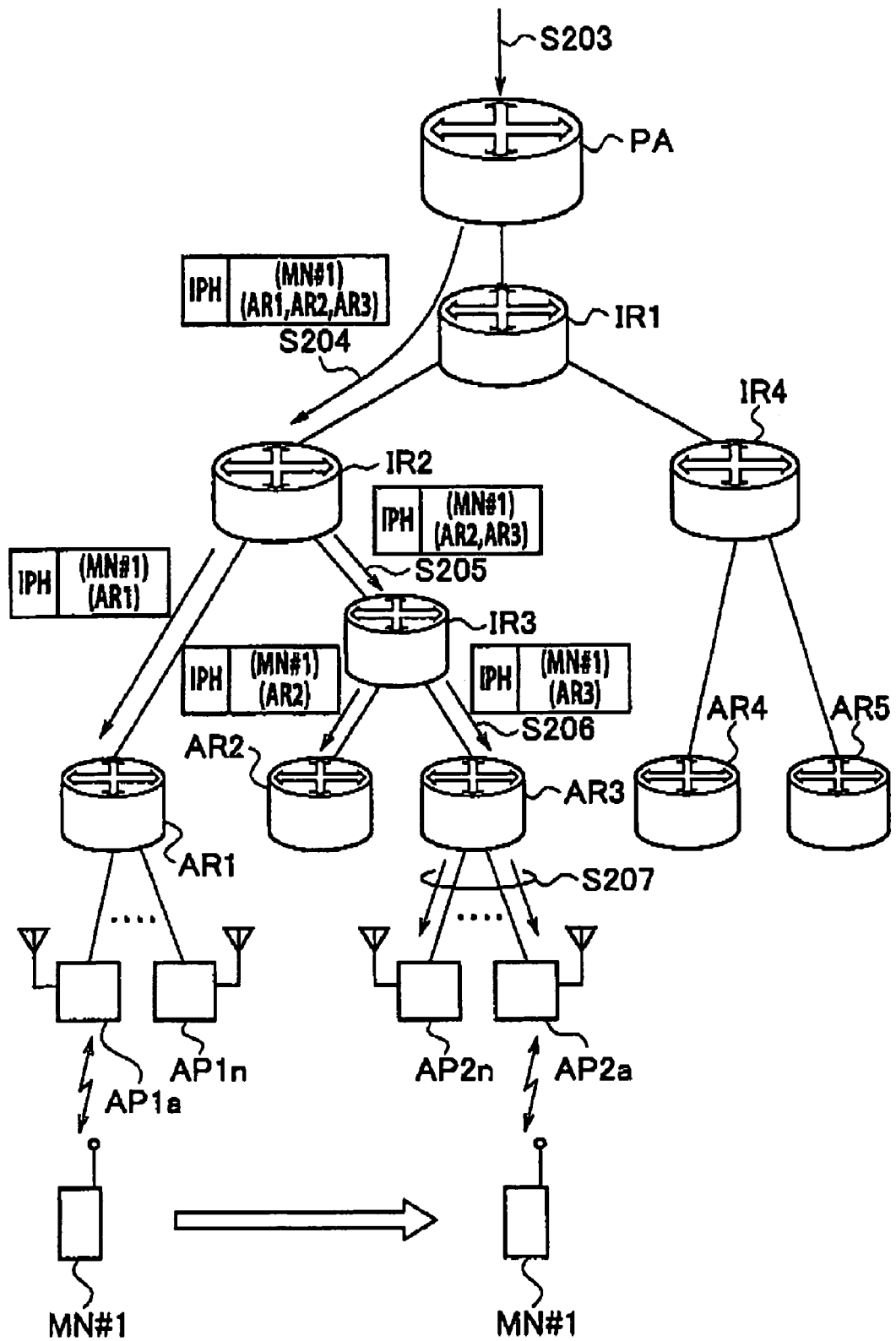
FIG. 9 is a view for explaining operation of transmitting a paging notification packet in the second embodiment of the present invention.

A second embodiment of the present invention will be described with reference to FIGS. 7 to 9. A description will be given below mainly on different points of this embodiment from the foregoing first embodiment.

A paging notification packet transmitting unit 25 of a paging agent PA according to this embodiment is configured to transmit one paging notification packet including information indicating access routers AR1 to AR3 (e.g., a list of the IP addresses of the access routers AR1 to AR3).

Figure 7:
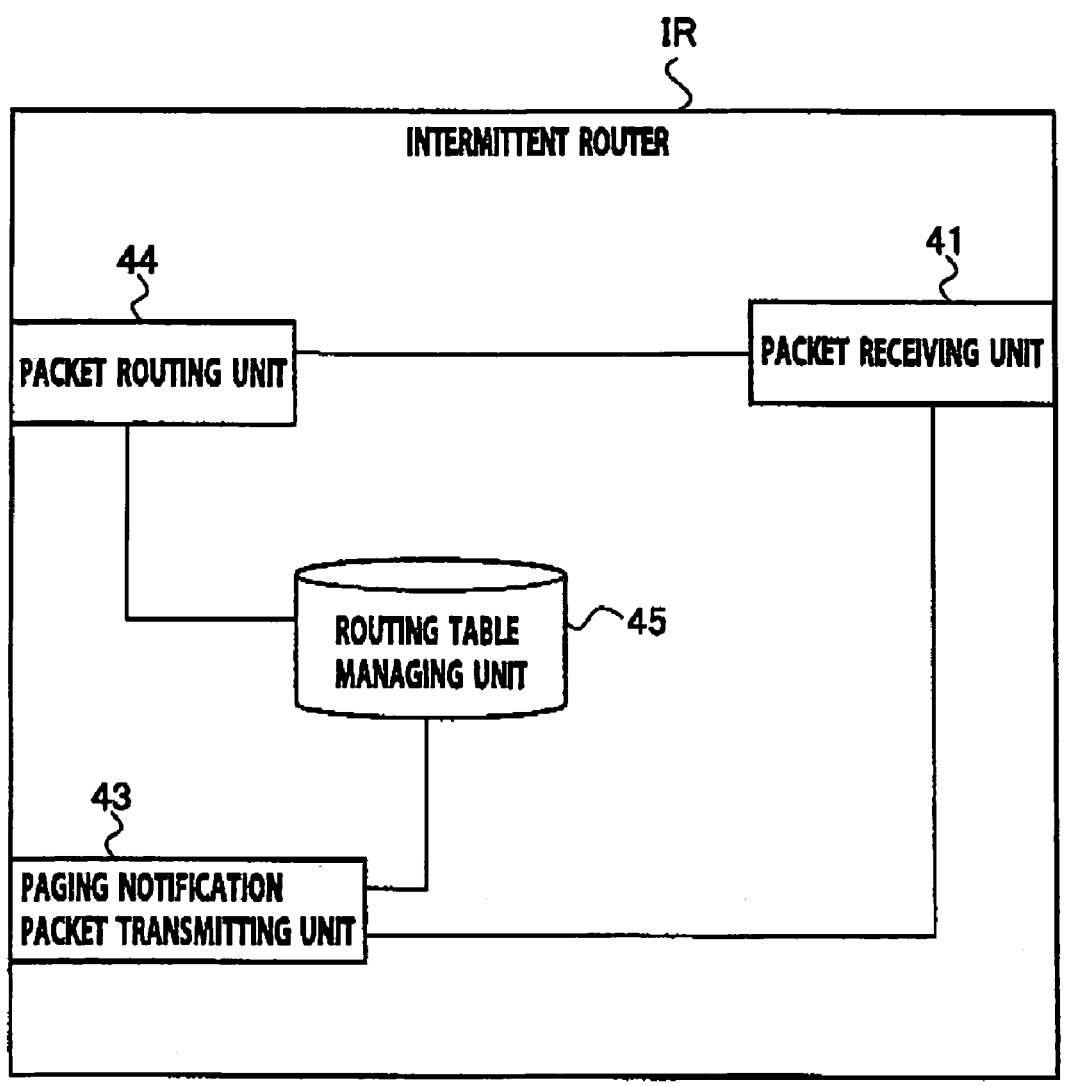
FIG. 7 is a functional block diagram of an intermittent router according to a second embodiment of the present invention.

As shown in FIG. 7, an intermittent router IR according to this embodiment is configured with a packet receiving unit 41, a paging notification packet transmitting unit 43, a packet routing unit 44, and a routing table managing unit 45.

The packet receiving unit 41 is configured to receive an IP packet (including a paging notification packet, a paging notification acknowledgment packet, and a paging request packet) transmitted from the paging agent PA, another intermittent router IR, or the like.

Moreover, when the packet receiving unit 41 recognizes that the received IP packet is a paging notification packet, based on a protocol identifier, header number or the like included in a received IP packet, the packet receiving unit 41 transmits the IP packet to the paging notification packet transmitting unit 43. Otherwise, the packet receiving unit 41 transmits the IF packet to the packet routing unit 44.

The paging notification packet transmitting unit 43 constitutes a routing determining unit which determines routing destinations of a paging notification packet transmitted from the packet receiving unit 41, in accordance with the information indicating access routers AR (e.g., a list of the IP addresses of the access routers AR1 to AR3) included in the paging notification packet.

Moreover, the paging notification packet transmitting unit 43 constitutes a transferring unit which copies the paging notification packet and transfers copied packets to a plurality of routing destinations determined in accordance with the information indicating the access routers AR1 to AR3 which is included in a paging notification packet, when receiving the paging notification packet from the packet receiving unit 41.

Specifically, the paging notification packet transmitting unit 43 refers to the routing table managed by the routing table managing unit 45 and the above-mentioned list of the IP addresses of the access routers AR1 to AR3, so as to classify the items on the list into routing destinations, to create paging notification packets including the classified respective items on the list, and to transfer the paging notification packets to the respective routing destinations.

The packet routing unit 44 is configured to route IP packets other than a paging notification packet, referring to the routing table.

The routing table managing unit 45 is configured to manage the above-mentioned routing table.

Next, overall operation in this embodiment will be described with reference to FIGS. 8 and 9. Steps 201 to 203 are the same operations as those of Steps 101 to 103 in the foregoing first embodiment (see FIGS. 5 and 6).

In Step 204, the paging agent PA transmits a paging notification packet including information indicating the access routers AR1 to AR3 (e.g., a list of the IP addresses of the access routers AR1 to AR3) to the intermittent router IR1. The intermittent router IR1 transfers the received paging notification packet to the intermittent router 1R2.

In Step 205, the intermittent router IR2 copies the received paging notification packet, in accordance with the information indicating the access router AR1 and AR3 which is included in the paging notification packet, and in accordance with the routing table.

Specifically, the intermittent router IR2 creates a paging notification packet including information indicating the access router AR1, transfers this packet to the access router AR1. Simultaneously, the intermittent router IR2 creates a paging notification packet including information indicating the access routers AR2 and AR3 and transfers this packet to the intermittent router IR3.

In Step 206, the intermittent router IR3 copies the received paging notification packet, in accordance with the information indicating the access routers AR2 and AR3 which is included in the paging notification packet, and in accordance with the routing table.

Specifically, the intermittent router IR3 creates a paging notification packet including information indicating the access router AR2, and transfers this packet to the access router AR2. Simultaneously, the intermittent router IR3 creates a paging notification packet including information indicating the access router AR3, and transfers this packet to the access router AR3.

In Step 207, when the access router AR3 recognizes that it has received the paging notification packet destined for the access router AR3, the access router AR3 transmits the paging notification packets by multicasting.

Figure 5:
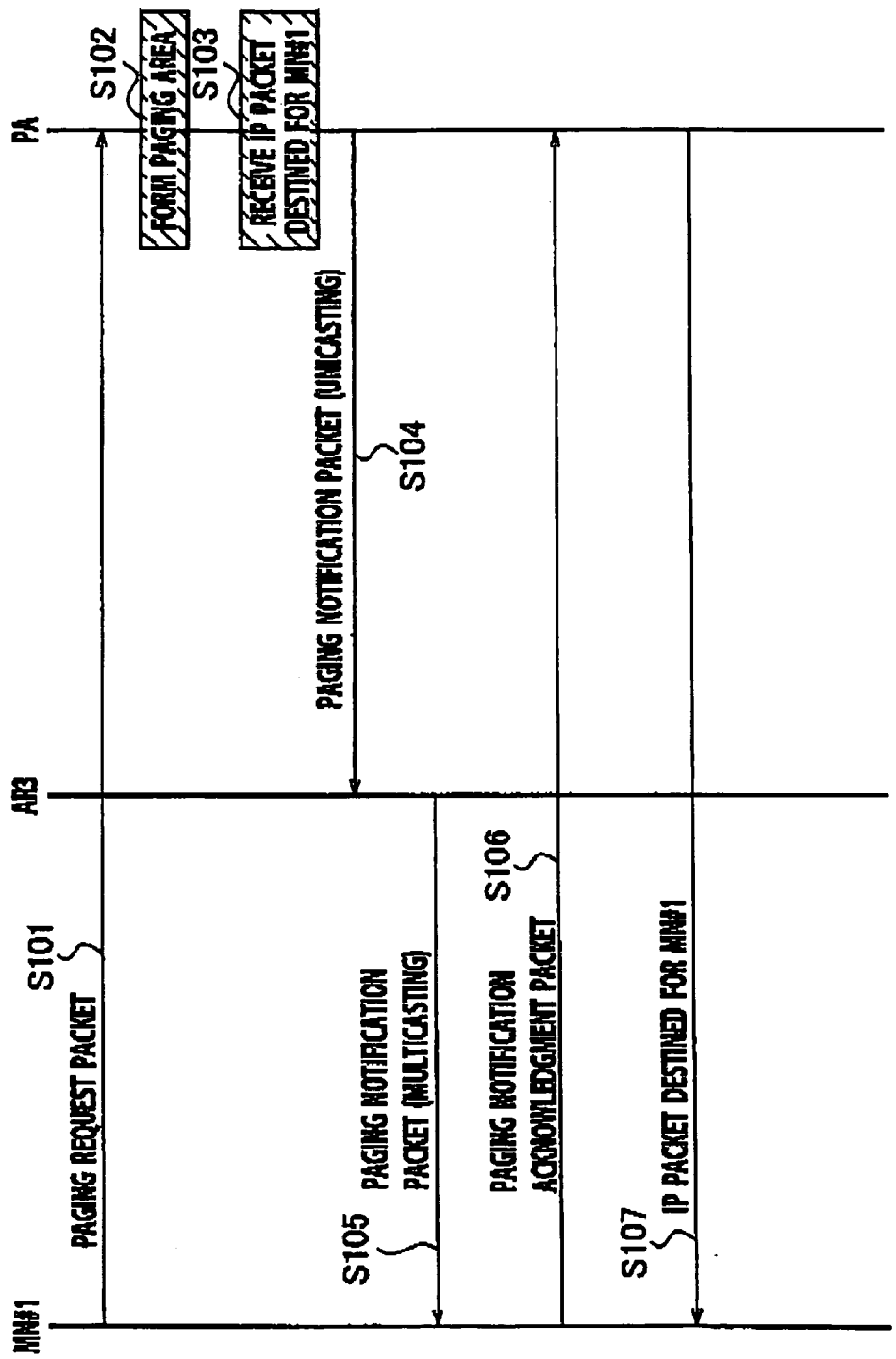
FIG. 5 is a sequence diagram showing overall operation in the first embodiment of the present invention.
Figure 6:
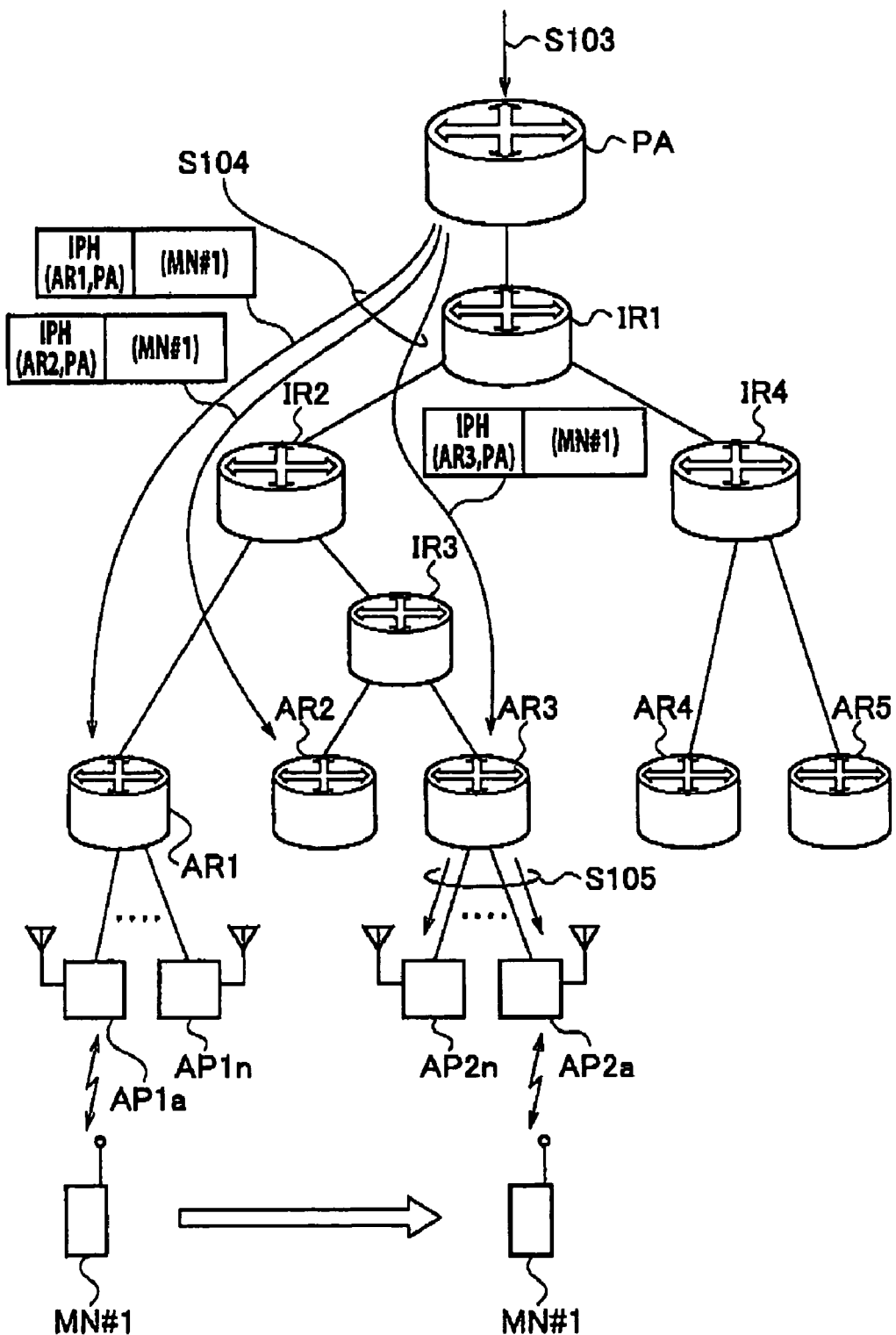
FIG. 6 is a view for explaining operation of transmitting a paging notification packet in the first embodiment of the present invention.

Steps 208 and 209 are the same operations as those of Steps 106 and 107 in the foregoing first embodiment (see FIGS. 5 and 6).

According to the second embodiment of the present invention, the paging agent PA transmits one paging notification packet including information indicating a plurality of access routers AR1 to AR3 forming the paging area. Therefore, it is possible to reduce paging notification packet traffic on the network.

Third Embodiment of the Invention

A third embodiment of the present invention will be described with reference to FIGS. 10 to 14. A description will be given below mainly on different points of this embodiment from the foregoing first and second embodiments.

A paging request packet transmitting unit 14 of a mobile node MN#1 according to this embodiment is configure to transmit to a paging agent PA a paging request packet including information indicating the access routers AR1 to AR3 that form a paging area and including an instruction to join in a multicast group G1, (Join (*, G1)).

A paging area managing unit 23 of the paging agent PA according to this embodiment is configured to manage a "mobile node ID" and a "multicast group ID" while associating them to each other, as shown in FIG. 10.

That is, the paging agent PA according to this embodiment is configured to manage the multicast group G1 as the paging area of the mobile node MN#1.

A paging notification packet transmitting unit 25 of the paging agent PA is configured to transmit a paging notification packet, by multicasting, to the multicast group G1, which is managed as the paging area of the mobile node MN#1.

As shown in FIG. 11, an intermittent router IR according to this embodiment includes a paging request packet transmitting unit 46 and a multicast group managing unit 47, in addition to the configuration of the intermittent router IR according to the foregoing second embodiment (see FIG. 7).

Here, the packet receiving unit 41 is configured to transmit a paging request packet to the paging request packet transmitting unit 46, when receiving the paging request packet.

Upon receiving the paging request packet, the paging request packet transmitting unit 46 is configured to refer to the routing table managing unit 45. When the access routers AR1 to AR3, which are included in the paging request packet, exist downstream of the intermittent router IR, the paging request packet transmitting unit 46 is configured to transmit the paging request packet including an instruction to join in the multicast group G1 to these access routers AR.

Moreover, the paging request packet transmitting unit 46 is configured to register information regarding the multicast group G1 in the multicast group managing unit 47. Furthermore, the paging request packet transmitting unit 46 is configured to transfer upstream the paging request packet.

The multicast group managing unit 47 is configured to manage the multicast group G1 including a plurality of the access routers AR1 to AR3.

Figure 12:
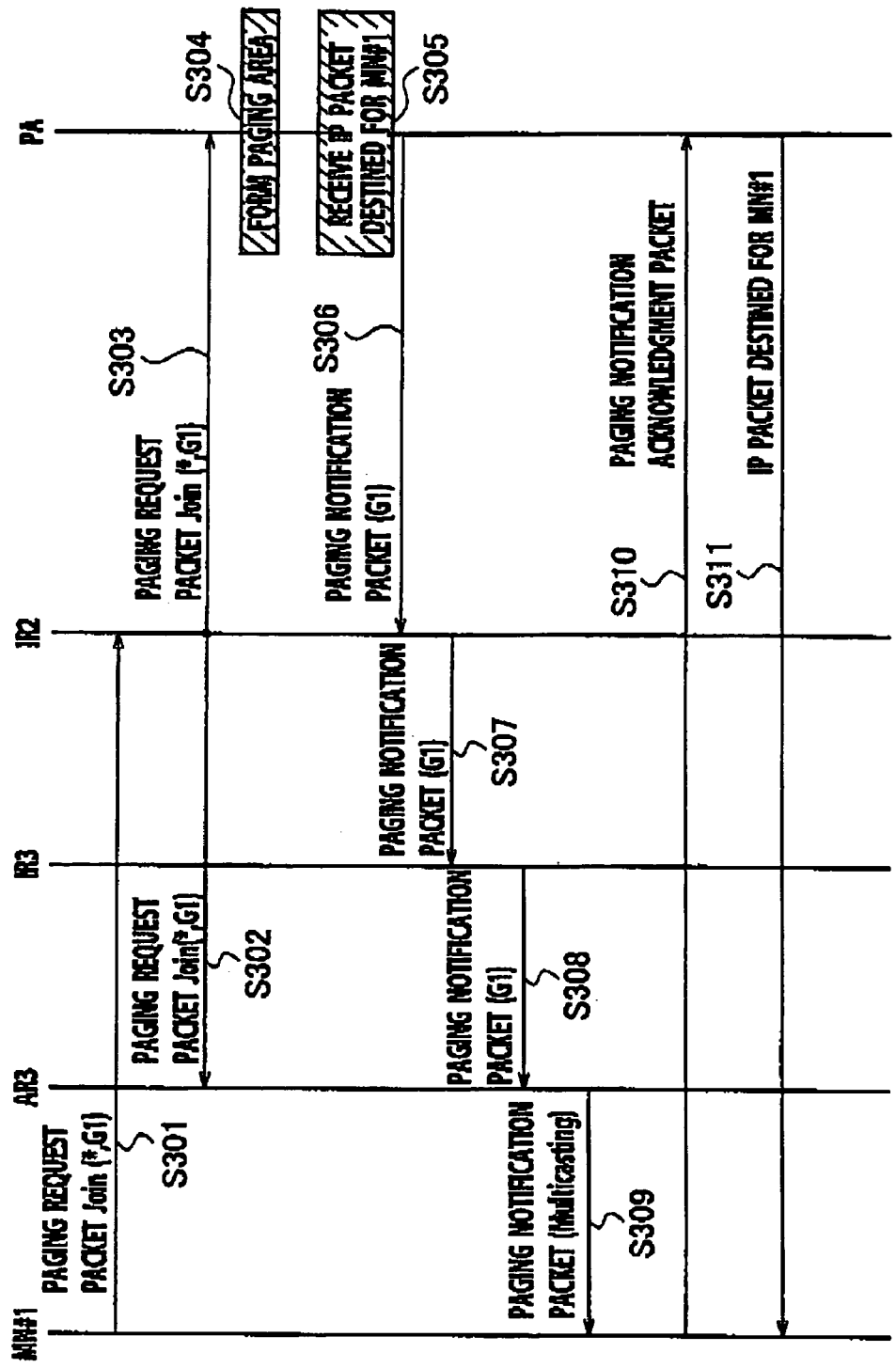
FIG. 12 is a sequence diagram showing overall operation in the third embodiment of the present invention.
Figure 13:
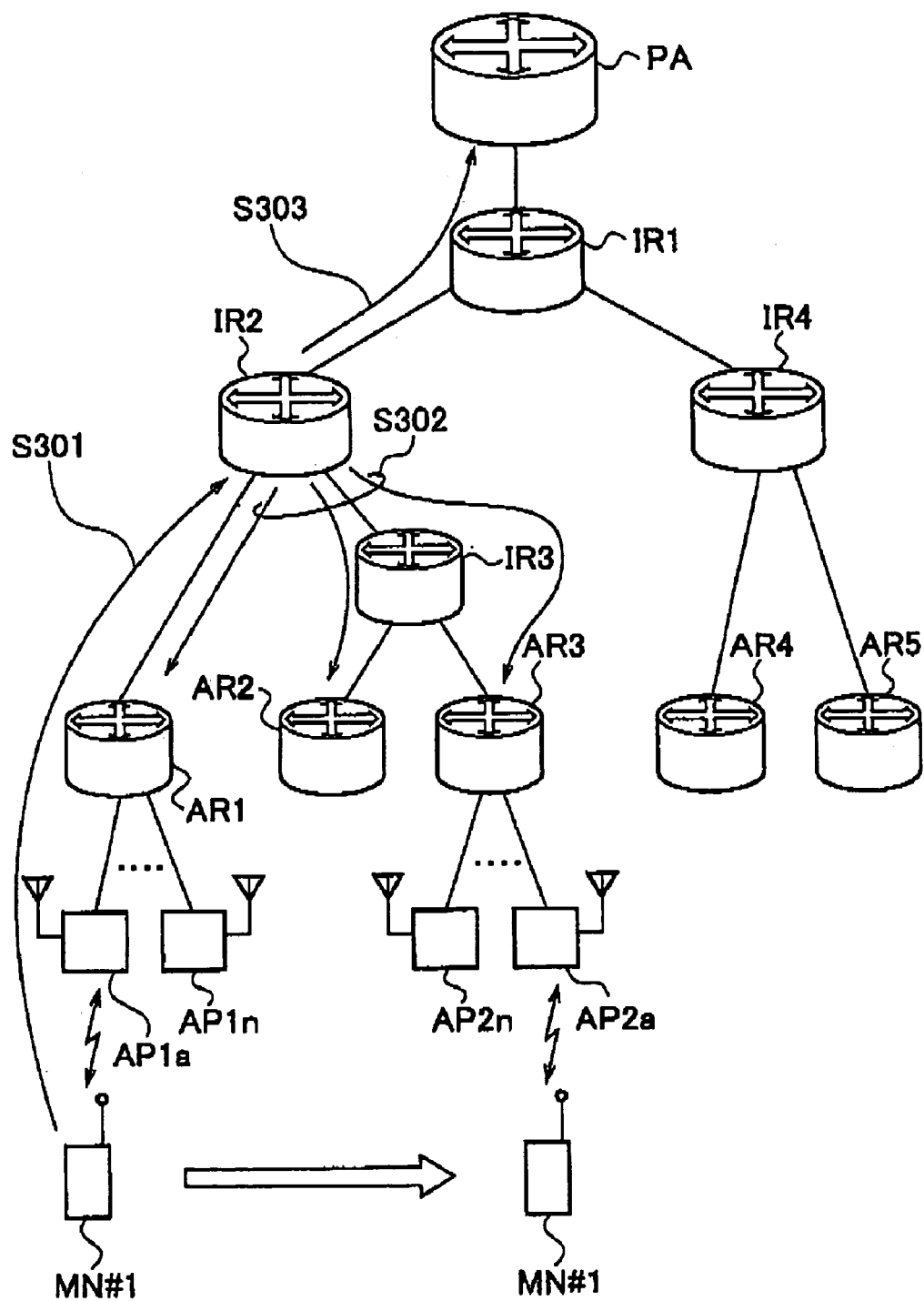
FIG. 13 is a view for explaining operation of transmitting a paging request packet in the third embodiment of the present invention.
Figure 14:
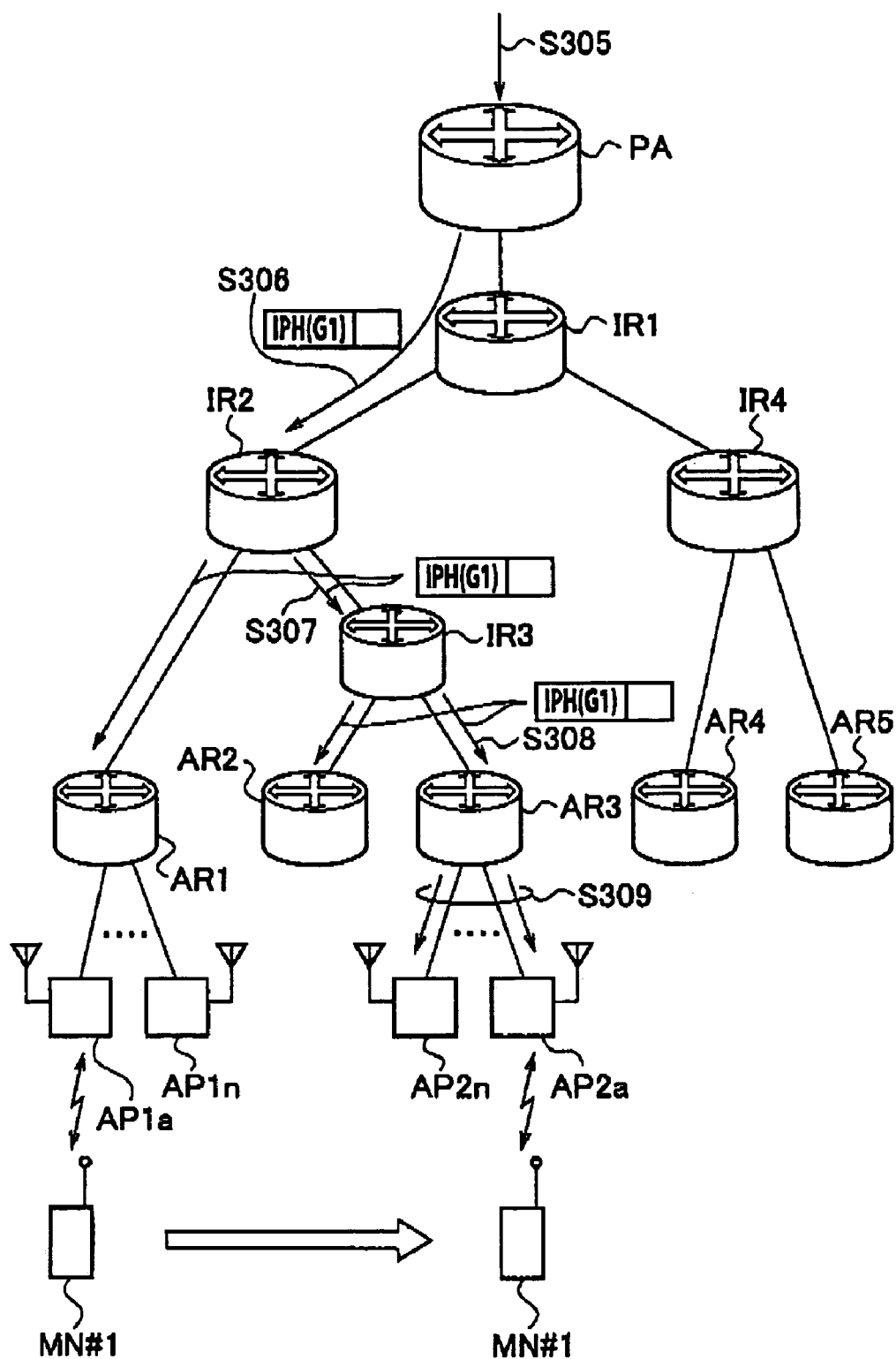
FIG. 14 is a view for explaining operation of transmitting a paging notification packet in the third embodiment of the present invention.

Next, overall operation in this embodiment will be described with reference to FIGS. 12 to 14.

In Step 301, the mobile node MN#1 transmits a paging request packet to the intermittent router IR2 via the access point AP1a and the access router AR1. The paging request packet is a packet for forming a paging area which is defined by the multicast group G1 to which the access routers AR1 to AR3 belong.

In Step 302, the intermittent router IR2 transmits the paging request packet giving an instruction to join in the multicast group G1 to the access routers AR1 to AR3 existing downstream of the intermittent router IR2.

At the same time, in Step 303, the intermittent router IR2 transmits the paging request packet to the paging agent PA via the intermittent router IR1 existing upstream of the intermittent router IR2.

In Step 304, the paging agent PA forms the paging area of the mobile node MN#1, based on the information indicating the access routers AR1 to AR3 and the instruction to join in the multicast group G1, which are included in the received paging request packet.

In Step 305, the paging agent PA receives an IP packet destined for the mobile node MN#1. Here, it is assumed that a state of the mobile node MN#1 has shifted from a state of communicating with the access point AP1a to a state of communicating with the access point AP2a.

In Step 306, the paging agent PA transmits a paging notification packet including identification information of the multicast group G1 by multicasting.

In Step 307, the intermittent router IR2 transmits the received paging notification packet including identification information of the multicast group G1 by multicasting.

In Step 308, the intermittent router IR3 transmits the received paging notification packet including identification information of the multicast group G1 by multicasting.

In Step 309, when the access router AR3 recognizes that it has received the paging notification packet destined for the multicast group G1, the access router AR3 transmits the paging notification packet by multicasting.

Steps 310 and 311 are the same operations as those of Steps 106 and 107 in the foregoing first embodiment.

In addition, the mobile node MN#1 can cancel transfer setting concerning the multicast group G1 at the same time when replying to the paging notification packet, by including an instruction to leave the multicast group in a paging notification acknowledgment packet in a similar way to that used for the paging request packet.

According to the third embodiment, a transfer route in multicasting is built in such a manner that an intermittent router copies a paging request packet transmitted from a mobile terminal and transfers a copied paging request packet to access routers forming a paging area. Accordingly, it is possible to suppress transmission load on the paging agent when the paging agent transmits a multicast group joining packet.

Fourth Embodiment of the Invention

Figure 16:
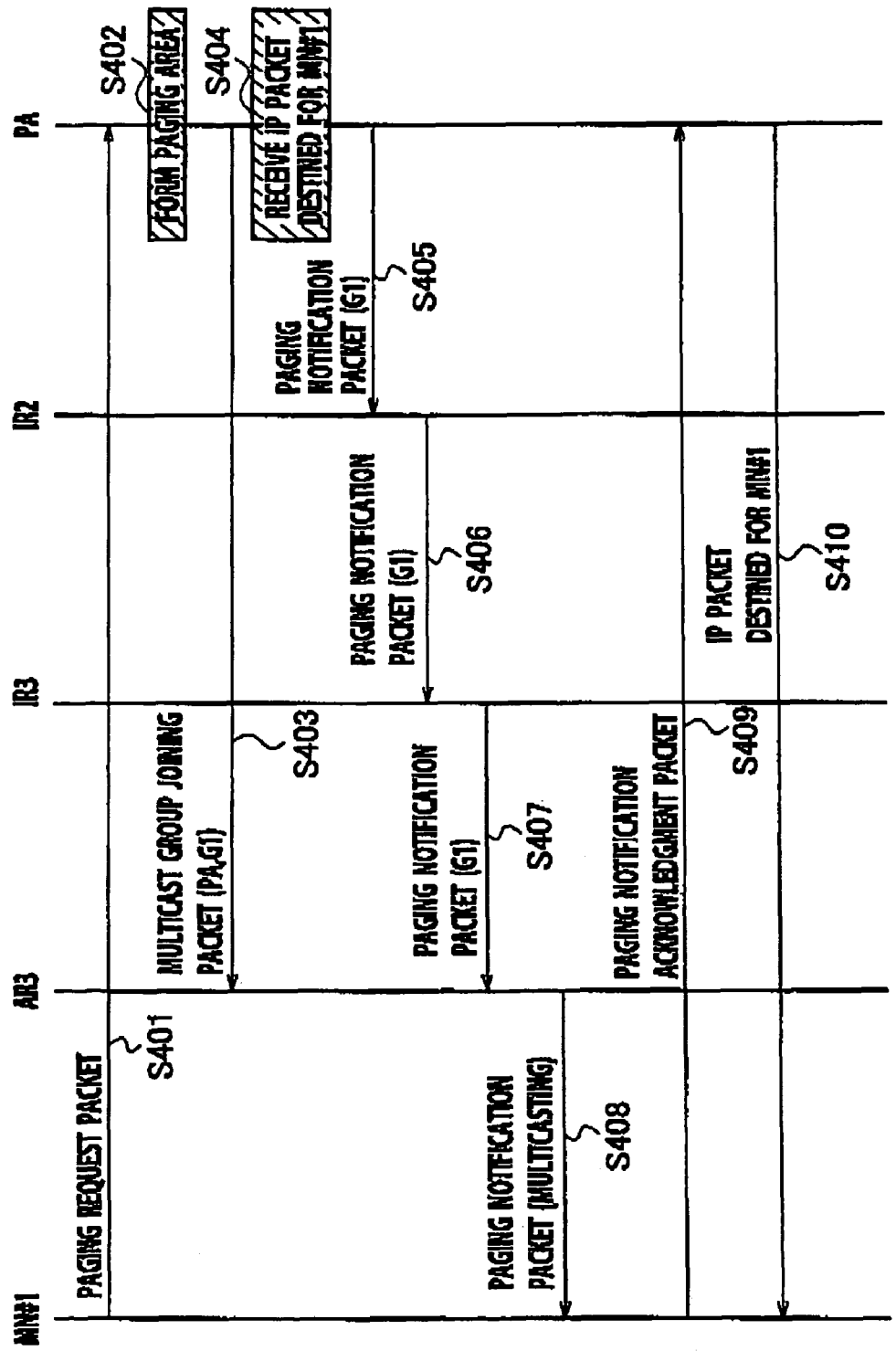
FIG. 16 is a sequence diagram showing overall operation in the fourth embodiment of the present invention.
Figure 17:
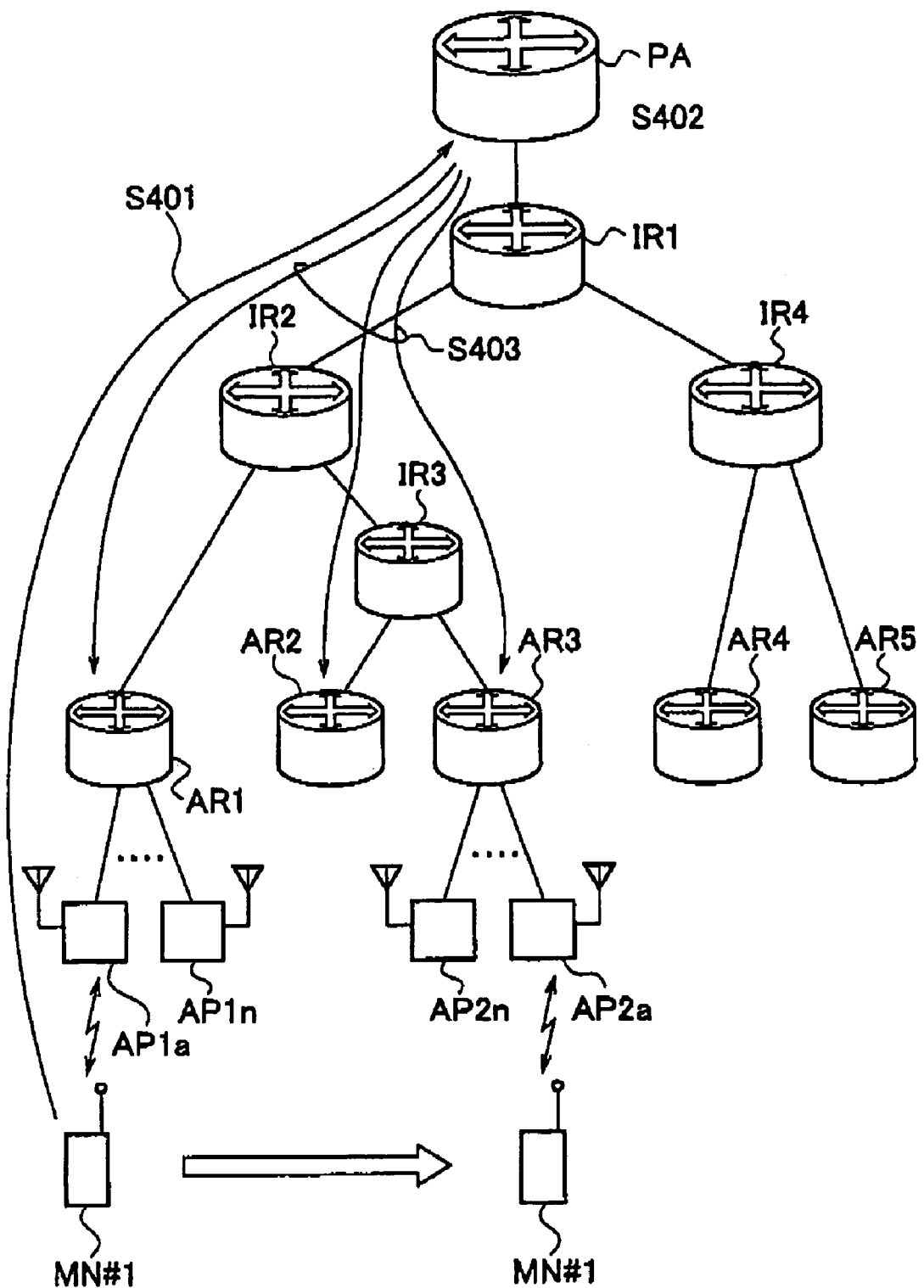
FIG. 17 is a view for explaining operation of transmitting a paging request packet in the fourth embodiment of the present invention.

A fourth embodiment of the present invention will be described with reference to FIGS. 15 to 17. A description will be given below mainly on different points of this embodiment from the foregoing first to third embodiments.

Figure 15:
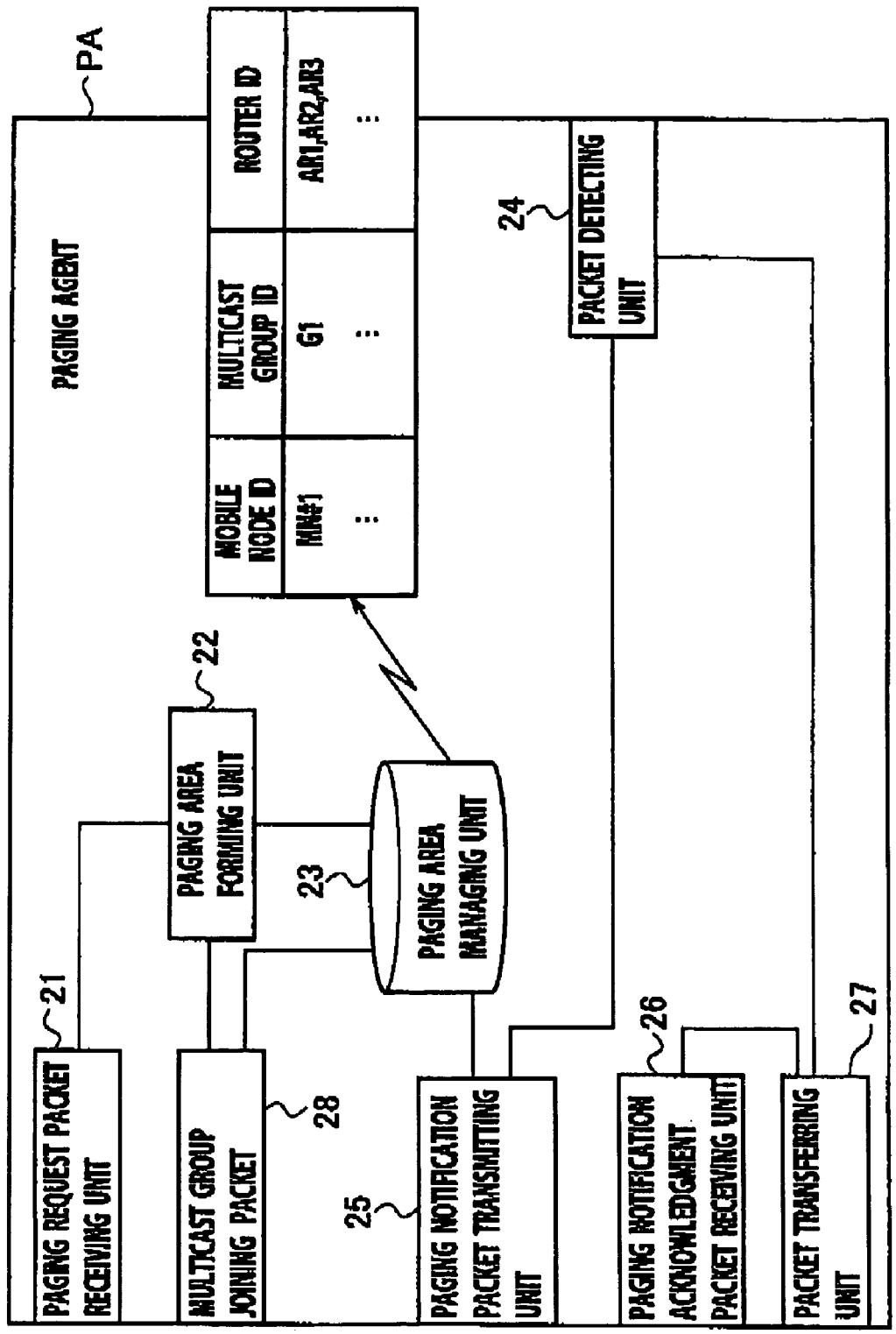
FIG. 15 is a functional block diagram of a paging agent according to a fourth embodiment of the present invention.

As shown in FIG. 15, a paging agent PA according to this embodiment includes a multicast group joining packet transmitting unit 28, in addition to the configuration of the paging agent PA according to the foregoing first embodiment.

The paging area forming unit 22 is configured to form a paging area, based on information indicating the access routers AR1 to AR3 which is included in a paging request packet transmitted from a mobile node MN#1.

Specifically, the paging area forming unit 22 is configured to make a multicast group G1 including the access routers AR1 to AR3, as the paging area of the mobile node MN#1.

The paging area managing unit 23 is configured to manage a "mobile node ID", a "multicast group ID" and a "router ID" while associating them to one another.

The multicast group joining packet transmitting unit 28 is configured to transmit a multicast group joining packet for prompting the routers ARs and IRs to join in the multicast group G1, to the access routers AR1 to AR3, when the paging area of the mobile node MN#1 is formed.

Next, overall operation in this embodiment will be described with reference to FIGS. 16 and 17.

In Step 401, the mobile node MN#1 transmits a paging request packet to the paging agent PA via the access point AP1a, the access router AR1, the intermittent router IR1, and the intermittent router IR2. The paging request packet is a packet for forming a paging area including the access routers AR1 to AR3.

In Step 402, the paging agent PA forms the paging area of the mobile node MN#1, based on information indicating the access routers AR1 to AR3 which is included in the received paging request packet.

Specifically, the paging agent PA forms the multicast group G1 including the access routers AR1 to AR3, as the paging area of the mobile node MN#1.

In Step 403, the paging agent PA transmits a multicast group joining packet including an instruction to join in the multicast group G1, to the access routers AR1 to AR3. In response to the received multicast group joining packet, each of the access routers AR1 to AR3 executes processing for joining in the multicast group G1.

In Step 404, the paging agent PA receives an IP packet destined for the mobile node MN#1. Here, it is assumed that a state of the mobile node MN#1 has shifted from a state of communicating with the access point AP1a to a state of communicating with the access point AP2a.

Steps 405 to 410 are the same operations as those of Steps 306 to 311 in the foregoing third embodiment.

In addition, the mobile node MN#1 can cancel the transfer setting concerning the multicast group G1 at the same time when replying to the paging notification packet, by including an instruction to leave the multicast group in a paging notification acknowledgment packet in a similar way to that used for the paging request packet. That is, the mobile node MN#1 can clear a multicast transfer tree which has become unnecessary.

Fifth Embodiment of the Invention

A fifth embodiment of the present invention will be described with reference to FIG. 18. This embodiment is characterized in that an access point AP transmits a paging notification packet transmitted from a paging agent PA, to a mobile node MN#1 by multicasting.

The access point AP is connected to the mobile node MN#1, either wired or wirelessly. For example, as the access point AP, it is possible to cite a base station or the like.

Figure 18:
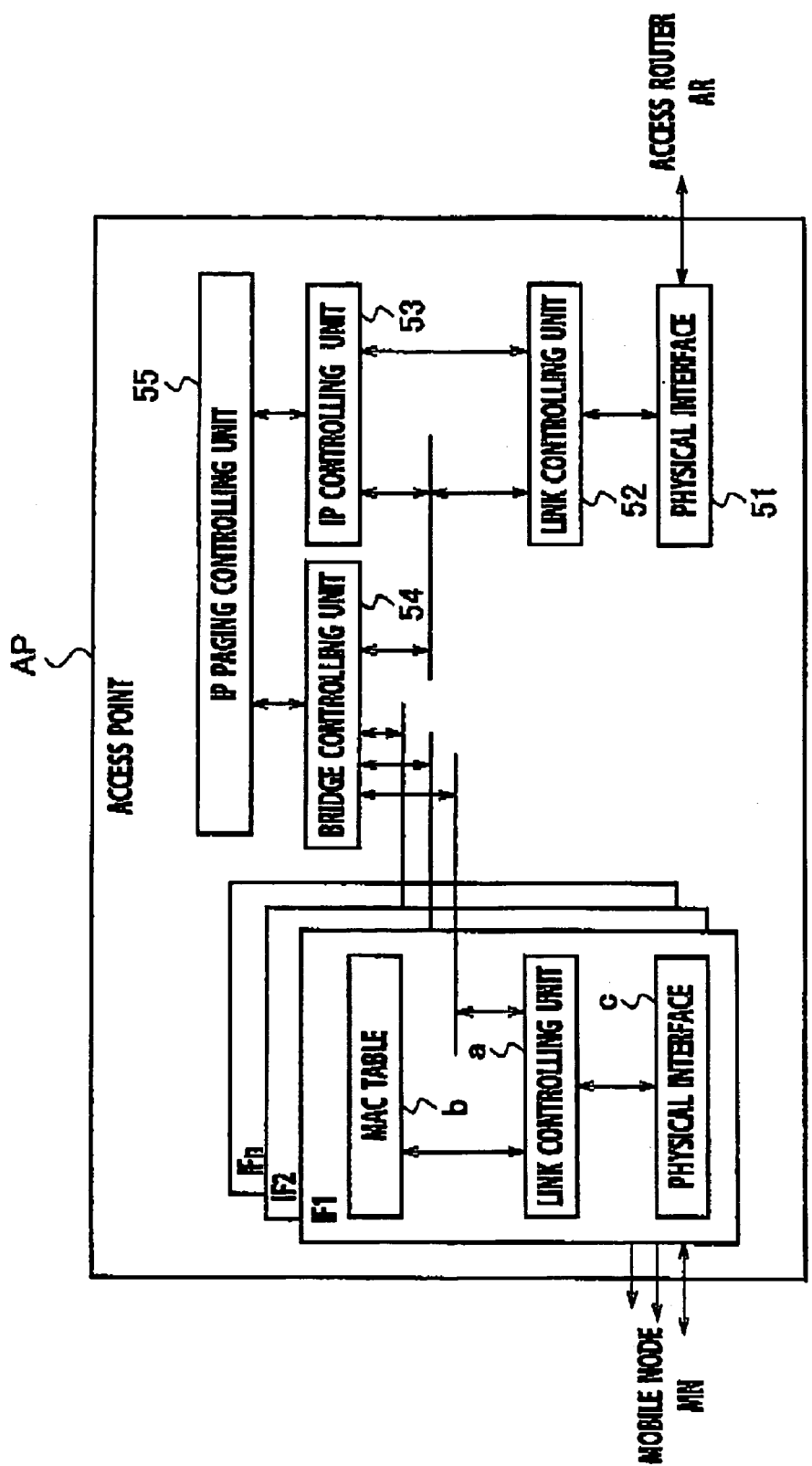
FIG. 18 is a functional block diagram of an access point according to a fifth embodiment of the present invention.

As shown in FIG. 18, the access point AP is configured with a physical interface 51, a link controlling unit 52, an IP controlling unit 53, a bridge controlling unit 54, an IP paging controlling unit 55, and a plurality of link interfaces IF1 to IFn.

The physical interface 51 is configured to control a physical layer between the access point AP and an access router AR on the network side.

The link controlling unit 52 is configured to control a link layer between the access point AP and the access router on the network side.

The IP controlling unit 53 is configured to control an IP layer.

Specifically, the IP controlling unit 53 judges whether or not the IP address in an IP packet, which is transmitted from the access router AR via the physical interface 51 and the link controlling unit 53, is a predetermined IP address (i.e., an IP address assigned to the access point AP).

That is, the IP controlling unit 53 judges whether or not the IP packet transmitted from the access router AR is an IP packet destined for the access point AP.

When the IP packet is not an IP packet destined for the access point AP, the IP controlling unit 53 transmits this IP packet, as it is, to the bridge controlling unit 54.

On the other hand, when the IP packet is an IP packet destined for the access point AP, the IP controlling unit 53 transmits this IP packet to the IP paging controlling unit 55.

The bridge controlling unit 54 is configured to execute processing of bridging between the IP controlling unit 53 and the plurality of link interfaces IF1 to IFn, and processing of bridging between the IP paging controlling unit 55 and the plurality of link interfaces IF1 to IFn.

The paging controlling unit 55 is configured to judge whether or not the IP packet transmitted from the IP controlling unit 53 is a paging notification packet (or a paging notification acknowledgment packet).

When it is judged that the IP packet transmitted from the IP controlling unit 53 is a paging notification packet, the IP paging controlling unit 55 transmits the paging notification packet, by multicasting, to the mobile node MN#1 via the bridge controlling unit 54 and the plurality of link interfaces IF1 to IFn.

Here, the IP paging controlling unit 55 may be configured to change a destination IF address included in the received paging notification packet into a multicast address that is effective in a specific link interface IF.

Moreover, the IP paging controlling unit 55 may be configured to confirm whether or not the paging notification packet has reached the mobile node MN#1, with a small amount of information (small overhead), by means of a link-layer signal using an well-known identifier which is predetermined between the access point AP and the mobile node MN#1 as in MPLS (MultiProtocol Label Switching) technology.

In this case, when the IP paging controlling unit 55 confirms that the paging notification packet has reached the mobile node MN#1, the IP paging controlling unit 55 transmits a paging notification acknowledgment packet to notify this fact, to the paging agent PA via the bridge controlling unit 54, the link controlling unit 52, and the physical interface 51.

Furthermore, the IP paging controlling unit 55 may be configured to transmit the paging notification packet to the bridge controlling unit 54, after designating the port of an appropriate link interface IF, based on an index indicated in the paging notification packet, attribute information preset in the access point AP, or the like.

In addition, when it is judged that the IP packet transmitted from the IP controlling unit 53 is a paging notification acknowledgment packet, the IP paging controlling unit 55 transmits a paging notification acknowledgment packet to the paging agent PA via the bridge controlling unit 54, the link controlling unit 52, and the physical interface 51.

The link interface IF includes a link controlling unit a, a MAC table b, and a physical interface c.

The link controlling unit a is configured to control a link connection between the access point AP and the mobile node MN#1. The MAC table b is configured to manage the MAC address of a mobile node MN capable of communicating through the link interface IF.

According to this embodiment, a base station or a link interface can be the minimum unit of a paging area.

<Modification 1>

Figure 19:
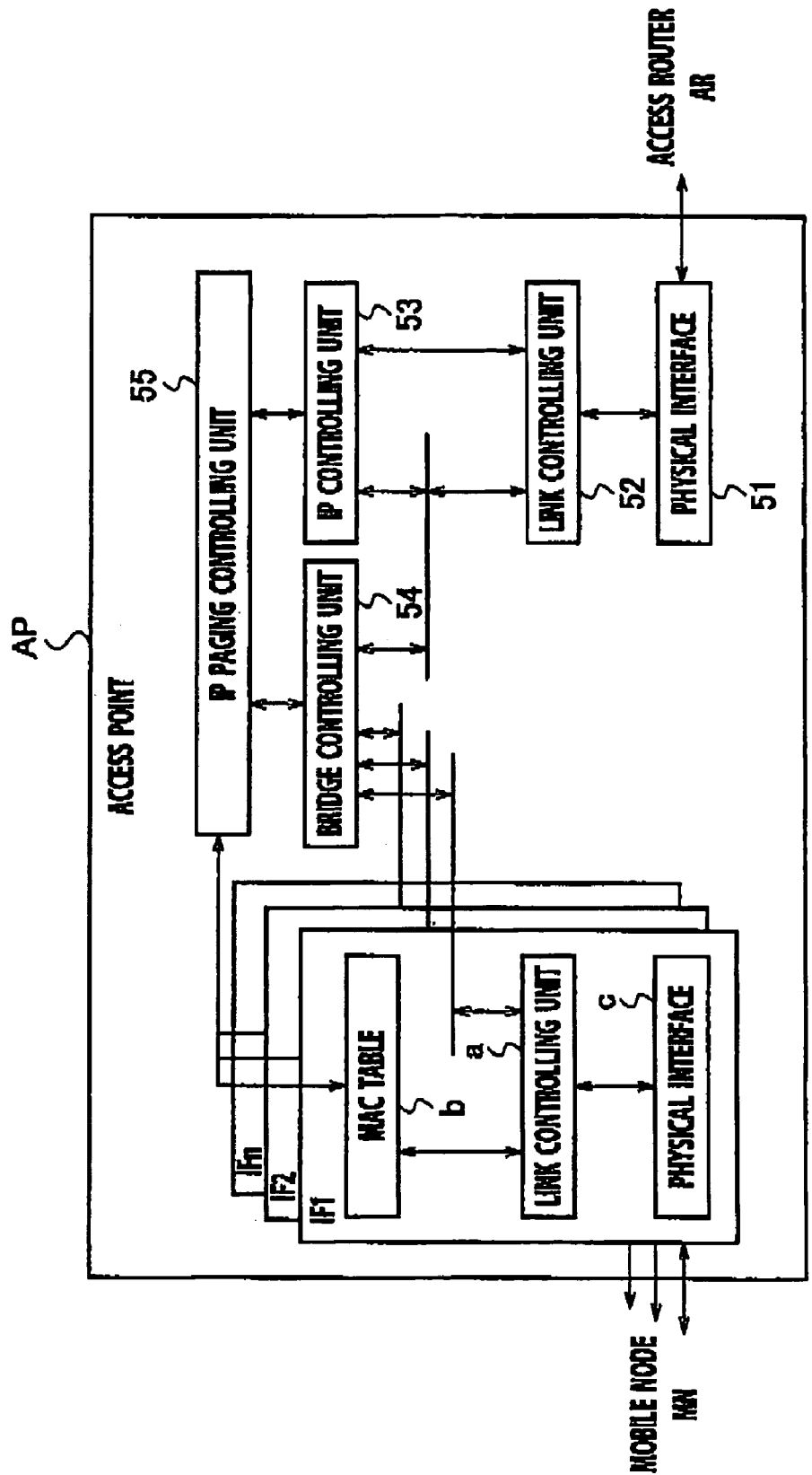
FIG. 19 is a functional block diagram of an access point according to Modification 1 of the present invention.

Modification 1 of the foregoing fifth embodiment will be described with reference to FIG. 19.

In this modification, the IP paging controlling unit 55 is configured to transmit a paging notification acknowledgment packet, which is a reply to a received paging notification packet, to the paging agent PA, when it is judged that the IP address in the received paging notification packet is a predetermined IP address (i.e., an IP address assigned to the access point AP), and it is also judged that a link connection has been established between the access point and the mobile node MN#1.

Specifically, when the IP paging controlling unit 55 has received a paging notification packet destined for the access point AP, the IP paging controlling unit 55 refers to the MAC tables b in the plurality of link interfaces IF1 to IFn and confirms the existence of the MAC address of the mobile node MN#1 involved in the paging notification packet. Then, the IP paging controlling unit 55 judges that an IP packet can reach the mobile node MN#1, and creates a paging notification acknowledgment packet and transmits it to the paging agent PA.

Here, in the case where the mobile node MN#1 is operating in the paging control mode, the mobile node MN#1, when switching access points AP, registers the MAC address of the mobile node MN#1 in the association table (corresponding to the MAC table) of the new access point AP by executing an association procedure.

Accordingly, if the MAC address of the mobile node MN#1, which is affixed to the paging notification packet, is registered in the association table, the IP paging controlling unit 55 can judge that an IP packet will be able to reach the mobile node MN#1. Then, the IP paging controlling unit 55 can return the paging notification packet to the paging agent PA without an IP packet being transmitted in a wireless section.

According to this modification, the access point AP acts for a function of confirming whether or not a paging notification packet can reach the mobile node MN#1, through link-layer control. Thus, it is possible to suppress resource consumption in the wireless section.

As described above, according to the present invention, a network system, a control apparatus, a router device, an access point, and a mobile terminal can be provided which can reduce the traffic on a network implementing paging control.

Various modifications will become possible for those skilled in the art after receiving the teachings of the present disclosure without departing from the scope thereof.

What is claimed is:

1. A network system for implementing paging control, comprising:
　a control apparatus configured to receive, from a mobile terminal, a paging area formation request packet instructing the control apparatus to form a paging area, to form the paging area based on the paging area formation request packet, and to instruct a plurality of router devices, identified by the paging area formation request packet as being in the paging area, to transmit a paging notification packet within the paging area of the mobile terminal upon receiving a packet destined for the mobile terminal, wherein
　the control apparatus is configured to transmit the paging notification packet to the plurality of router devices forming the paging area,
　upon receipt of the paging notification packet, each of the plurality of router devices is configured to transmit the paging notification packet to a plurality of devices, including a plurality of access points, by multicasting,
　upon receipt of the paging notification packet, each of the plurality of access points is configured to transmit the paging notification packet to the mobile terminal through a link connection by multicasting, when it is judged that an IP address in the paging notification packet is a predetermined IP address,
　the mobile terminal, upon receiving the paging notification packet, transmits a paging notification acknowledgment packet to the control apparatus, and
　the control apparatus transfers the packet to the mobile terminal based on location information included in the paging notification acknowledgment packet.

2. A control apparatus in a network implementing paging control in which the control apparatus, upon receiving a packet destined for a mobile terminal, transmits a paging notification packet to a paging area of the mobile terminal, so as to obtain location information of the mobile terminal and to determine a transfer destination of a received packet, the control apparatus comprising:
　a paging area formation request packet receiver configured to receive a paging area formation request packet, from the mobile terminal which instructs the control apparatus to form a paging area, and to form the paging area by instructing a plurality of router devices, specified by the paging area formation request packet as being included in the paging area;
　a paging notification packet transmitter configured to transmit the paging notification packet to the plurality of router devices forming the paging area when a packet is received which is destined for the mobile terminal, wherein
　upon receipt of the paging notification packet, each of the plurality of router devices is configured to transmit paging notification packet to the mobile terminal by multicasting,
　the control apparatus receives a paging notification acknowledgment packet from the mobile terminal after the mobile terminal receives the paging notification packet, and
　the control apparatus transfers the packet to the mobile terminal based on the location information in the paging notification acknowledgment packet.

3. The control apparatus according to claim 2, wherein the paging notification packet transmitter is configured to transmit the paging notification packet to each of the plurality of router devices by unicasting.

4. The control apparatus according to claim 2, wherein the paging notification packet transmitter is configured to transmit the paging notification packet including information indicating the plurality of router devices.

5. The control apparatus according to claim 2, further comprising:
　a manager configured to manage the mobile terminal and a multicast group including the plurality of router devices while associating the mobile terminal and the multicast group with each other; and wherein
　the paging notification packet transmitter is configured to transmit the paging notification packet to the multicast group.

6. The control apparatus according to claim 5, further comprising:
　a multicast group joining packet transmitter configured to transmit a multicast group joining packet to the plurality of router devices, the multicast group joining packet prompting each of the plurality of router devices to join in the multicast group; and wherein
　the manager is configured to manage the mobile terminal and the multicast group including the plurality of router devices while associating the mobile terminal and the multicast group with each other, the plurality of router devices being designated in a paging area formation request packet received from the mobile terminal.

7. A mobile terminal in a network configured to perform mobility management and to implement paging control in which a control apparatus in the network, upon receiving a packet destined for the mobile terminal, transmits a paging notification packet to a paging area of the mobile terminal, so as to obtain location information of the mobile terminal and to determine a transfer destination of a received packet, the mobile terminal comprising:
　a controller configured to control generation of a paging area formation request packet that includes information indicating a plurality of router devices to form the paging area;
　a paging area formation request packet transmitter configured to transmit the paging area formation request packet as an instruction to form the paging area, wherein the paging area formation request packet provides instructions to the plurality of router devices forming the paging area; and
　a paging notification acknowledgment packet transmitter configured to transmit a paging notification acknowledgment packet upon receiving a paging notification packet through the plurality of router devices based on the provided instructions.

* * * * *